United States Patent [19]
Hoshino et al.

[11] Patent Number: 5,995,204
[45] Date of Patent: Nov. 30, 1999

[54] PHOTOGRAPHIC IMAGE PROCESSING APPARATUS

[75] Inventors: Yasushi Hoshino; Toshiki Fujisawa; Kosei Miyauchi; Jun Ikuyama, all of Hachioji, Japan

[73] Assignee: Konica Corporation, Tokyo, Japan

[21] Appl. No.: 08/876,646

[22] Filed: Jun. 16, 1997

[30] Foreign Application Priority Data

Jun. 17, 1996 [JP] Japan .................................. 8-155206
Aug. 23, 1996 [JP] Japan .................................. 8-222187

[51] Int. Cl.$^6$ .............................. H04N 1/04; G03B 27/62
[52] U.S. Cl. .......................... 355/75; 358/487; 358/496; 358/498; 348/96
[58] Field of Search .................................. 358/474, 487, 358/494, 496, 498; 348/96; 355/18, 38, 40, 75

[56] References Cited

U.S. PATENT DOCUMENTS 5,754,314  5/1998  Araki et al. .............................. 355/487
5,790,187  8/1998  Suzuki ....................................... 348/96
5,808,757  9/1998  Ikeda ........................................ 358/498

*Primary Examiner*—Alan A. Mathews
*Attorney, Agent, or Firm*—Frishauf, Holtz, Goodman, Langer & Chick

[57] ABSTRACT

A photographic film scanner which includes: a carrier receiver section for receiving one of: (a) the first film carrier having an accommodation section, for accommodating a cartridge in which a rolled film is enclosed, and a conveying mechanism, for conveying the rolled film; and (b) the second film carrier for holding a film. The photographic film scanner further includes a scanner for reading image information from one of the rolled film, accommodated in the cartridge, and the film, held by the second film carrier; a detector for detecting a load of the first film carrier and the second film carrier into the carrier receiver; a contact point for electrically connecting the carrier receiver section and the first film carrier; and a discrimination circuit for automatically discriminating between the first film carrier and the second film carrier by sending electric signals through the contact point when the detector detects the load of one of the first film carrier and the second film carrier.

30 Claims, 40 Drawing Sheets

(TOP VIEW)

(WHEN A CARRIER IS NOT INSERTED YET)

(WHEN A CARRIER IS INSERTED)

(WHEN RETRACTED AND STOPPED AT STANDARD POSITION)

4 FRAMES POSITIVE

6 FRAMES
(NEGATIVE, POSITIVE, OR B/W)

FIG. 13 (1)
6 FRAMES POSITIVE
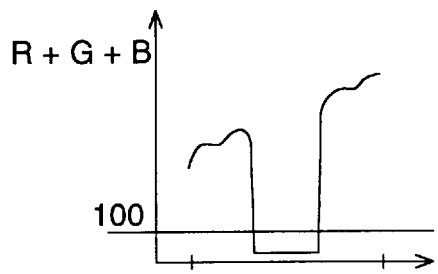
FIG. 13 (2)
6 FRAMES NEGATIVE B/W
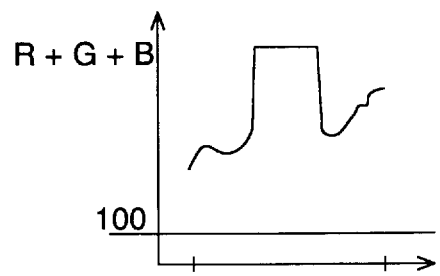
FIG. 13 (3)
6 FRAMES COLOR NEGATIVE
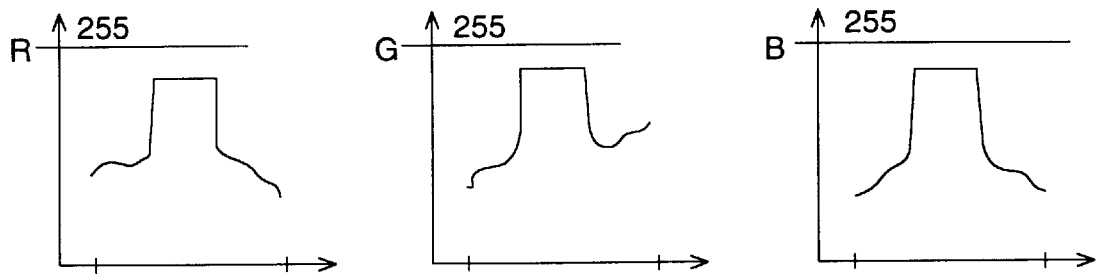
FIG. 13 (4)
6 FRAMES B/W NEGATIVE

TO OBTAIN MEAN VALUE OF
DR+DG+DB IN AREA Ai

⇩ TO NORMALIZE TO 0 - 100

NORMALIZED AREA A

NORMALIZED AREA C

ADDING AREAS A AND C TOGETHER

AREA A+C

4 FRAMES POSITIVE PROVIDED THAT A VALUE OF VALLEY IS NOT 0

FIG. 37 (a)
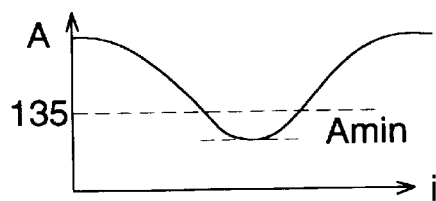
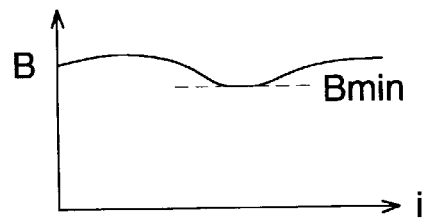
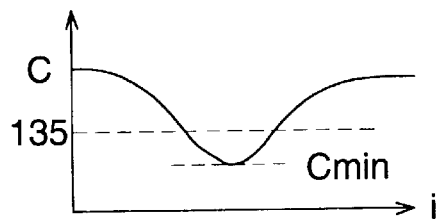
FIG. 37 (b)
CONDITIONS
$\begin{pmatrix} Amin < 135 \\ Bmin < 135 \end{pmatrix}$  ⇒ POSITION OF RIB IS BLACK ENOUGH
$(Amin - Cmin) < 50$ ⇒ DENSITY OF RIB IS WELL-BALANCED ON LEFT AND RIGHT
$\begin{pmatrix} Amin < Bmin \\ Cmin < Bmin \end{pmatrix}$ ⇒ POSITION OF RIB IS MORE BLACK THAN FILM
FIG. 37 (c)
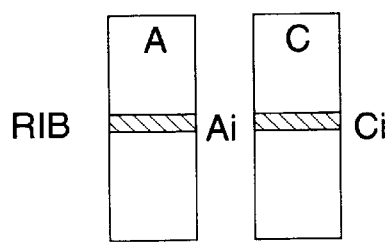
DENSITY IS UNIFORM ⇒ WITHIN A POSITION OF RIB

MONOCHROMATIC

SPECIFIC 6 FRAMES
COLOR NEGATIVE

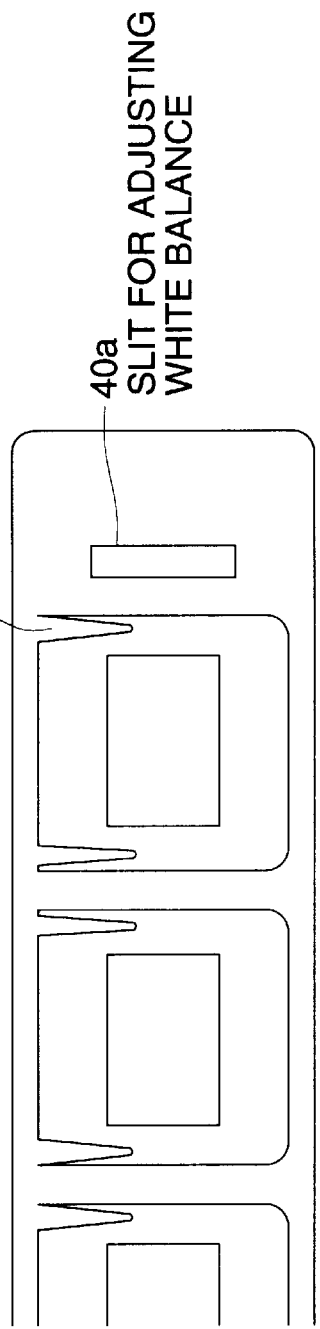
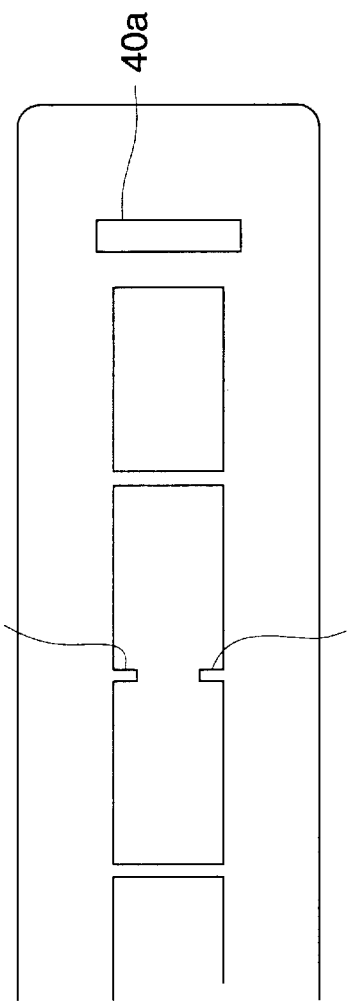
FIG. 42 (a)
FIG. 42 (b)

PHOTOGRAPHIC IMAGE PROCESSING APPARATUS

BACKGROUND OF THE INVENTION

The present invention relates to a photographic image processing apparatus wherein image information recorded on a film is read by a film scanner and is displayed.

Recently, there has been used a photographic image processing system wherein an image obtained by a camera through photographing is converted into an electronic digital image data. In many of such a system, a film that is subjected to photographing by a camera and then is developed is read by a film scanner, and then is converted into digital image data to be stored.

On the other hand, developed films are in various forms, and the most common form, for example, is a J 135 negative film which is returned from a photofinishing laboratory in a form of a film strip containing 6 frames (hereinafter referred to as a piece film), or is a J 135 reversal film wherein each frame is usually mounted on a holder (hereinafter referred to as a mounted film). Further, in the advanced photographic system announced recently, a developed film is returned from a photofinishing laboratory in a form of a film rewound entirely into a cartridge (hereinafter referred to as am IX-240 long film), resulting in a diversified film types.

Heretofore, discrimination of film types has been done by an operator who has inputted through a key board for the discrimination. In this case, there has been a problem that an erroneous operation of an operator has resulted in a wrong film type. Further, even in the case of designating a frame to be pre-scanned, an operator had to designate, through a key board, a frame to be pre-scanned. Therefore, even in the case of a photographic image processing apparatus which is one of the photographic image processing system mentioned above, there is a demand for an apparatus which complies with requests of a user to be easy to operate and to provide an image screen that is easy to see, while accepting various types of photographic films.

SUMMARY OF THE INVENTION

The present invention has been achieved in view of the requests mentioned above, and its object is to provide a photographic image processing apparatus in which a film type is automatically read from the inserted film carrier, and an operation for pre-scanning has been improved to be easier for the film carrier which is for an advanced photographic system.

An example configuration of the photographic image processing apparatus, for solving the problems mentioned above, includes a carrier receiving section for receiving one of: (a) the first film carrier having an accommodation section, for accommodating a cartridge in which a rolled film is enclosed, and a conveying mechanism, for conveying the rolled film; and (b) the second film carrier for holding a film; a scanner for reading image information from one of the rolled film, accommodated in the cartridge, and the film, held by the second film carrier; a detector for detecting a load of one of the first film carrier and the second film carrier to the carrier receiving section; a contact point for electrically connecting the carrier receiving section and the first film carrier; and a discriminator for discriminating between the first film carrier and the second film carrier by sending electric signals through the contact point when the detector detects the load of one of the first film carrier and the second film carrier.

Another example configuration of the photographic image processing apparatus includes: a carrier receiving section for receiving one of: (a) the first film carrier for holding a mounted film; and (b) the second film carrier for holding a piece film; a scanner for reading image information from one of the mounted film, held by the first film carrier, and the piece film, held by the second film carrier; a detector for detecting a load of one of the first film carrier and the second film carrier to the carrier receiving section; a discriminator for discriminating between the first film carrier and the second film carrier according to image data of the image information corresponding to the first predetermined region of one of the mounted film and the piece film when the detector detects the load of one of the first film carrier and the second film carrier.

Further, one other example configuration of the photographic image processing apparatus includes: a carrier receiving section for receiving a film carrier for holding a film; and a scanner for reading image information from the film, held by the film carrier; a detector for detecting a load of the film carrier to the carrier receiving section; a determinator for determining a type of the film according to image data, of the image information, corresponding to a predetermined region, which includes an unexposed area of the film and an area in the vicinity of the unexposed area, when the detector detects the load of the film carrier.

In the constitution of the invention, it is possible to discriminate whether a film is a specific 6-frame color negative film or of a monochromatic type by checking whether the conditions of prescribed plural threshold values are satisfied or not, because color separation data obtained through re-scanning with shortened reading time are divided into one which enters a linear area of CCD from a saturation area thereof and one which does not enter, in the case of a specific 6-frame color negative film.

BRIEF DESCRIPTION OF THE DRAWINGS

FIG. 13(1)–FIG. 13(4) represent a diagram showing data characteristics of area B for each type of film.

FIGS. 37(a)–37(c) represent an illustration for rib judgment.

FIGS. 42(a) and 42(b) represent an illustration of ribs.

DETAILED DESCRIPTION OF THE INVENTION

Figure 1:
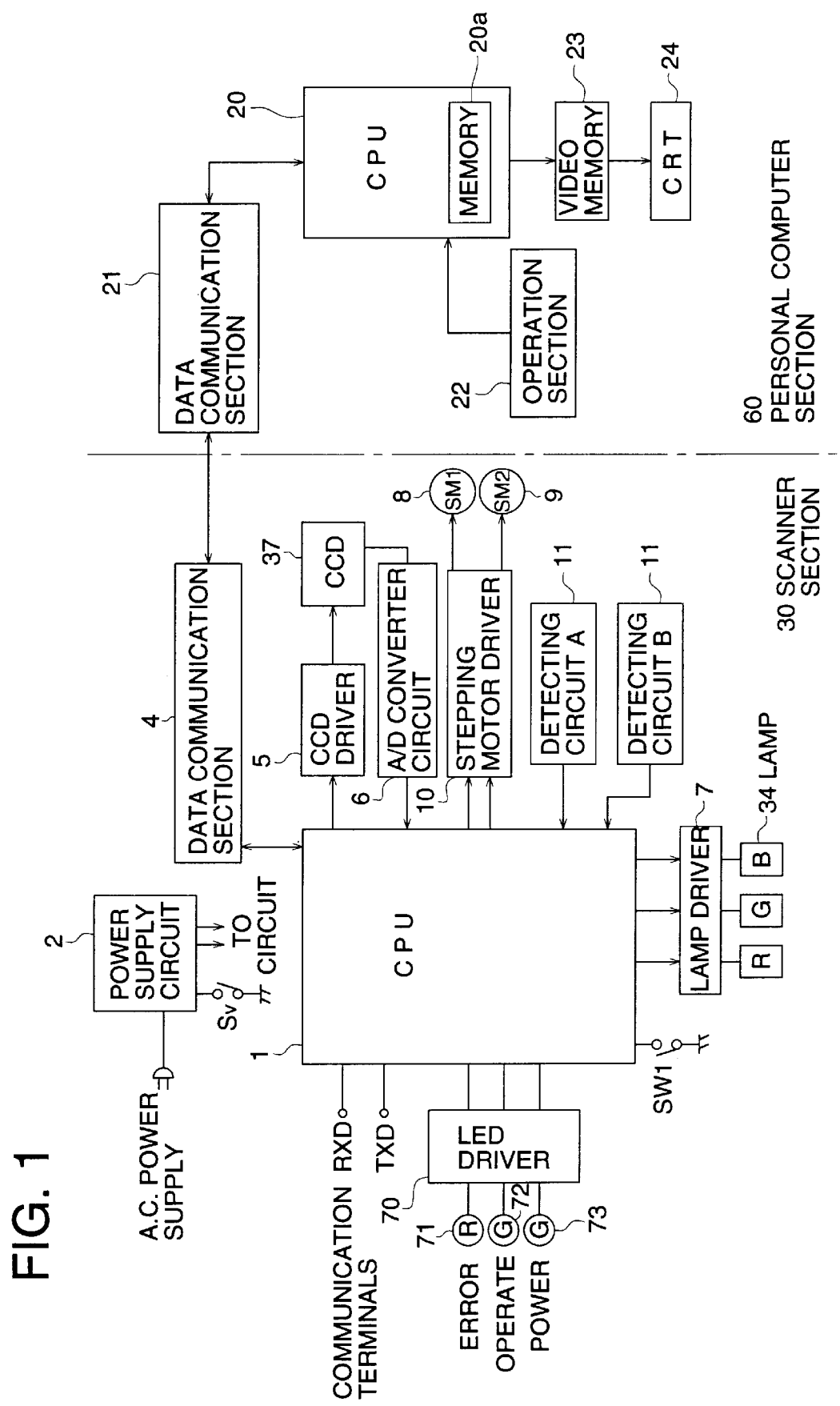
FIG. 1 is a block diagram showing an example of the electric structure in an example of the invention.

The first example of the invention will be explained in detail as follows, referring to the drawings.

Figure 2:
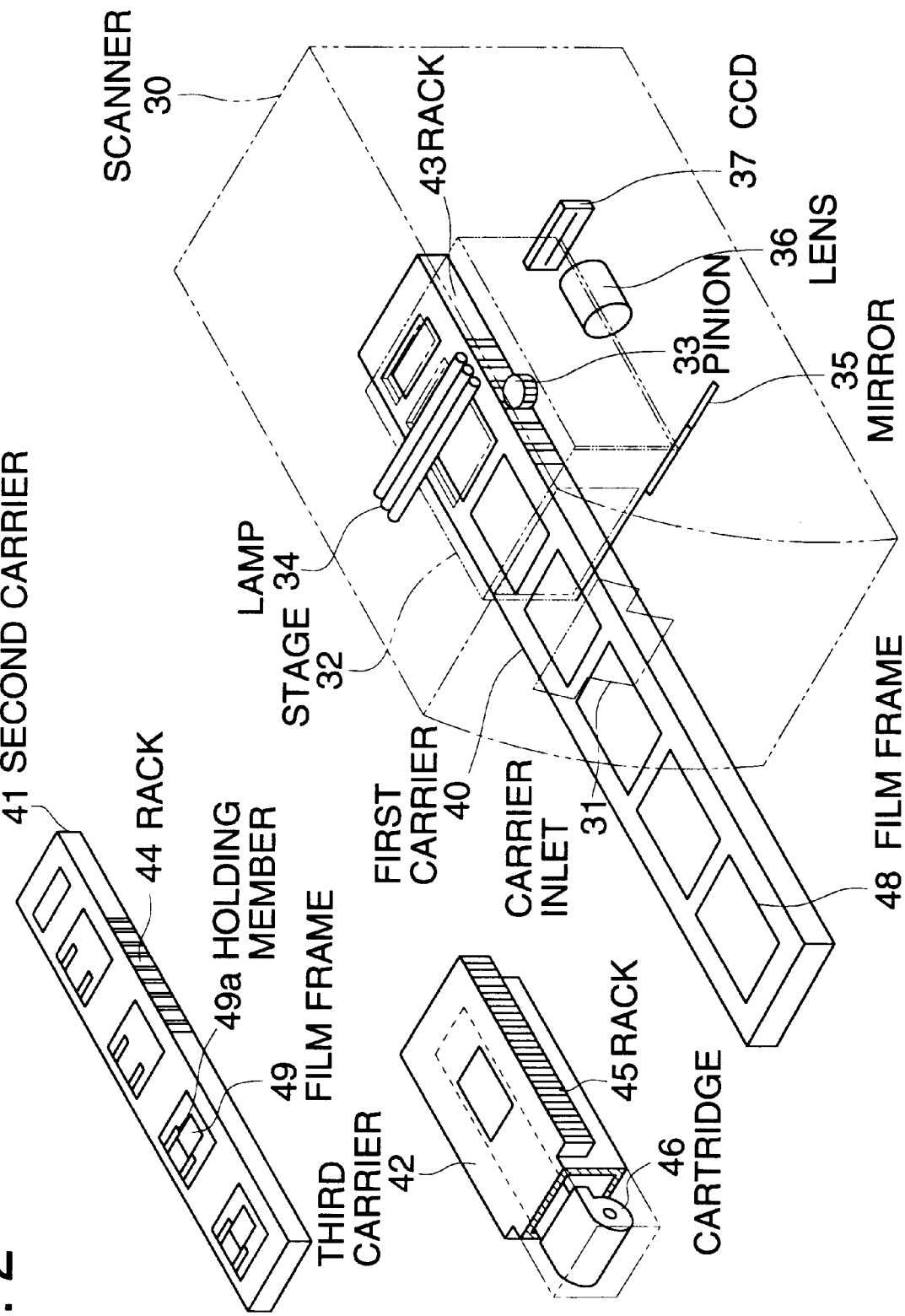
FIG. 2 is a diagram showing an example of the mechanical structure in an example of the invention.
Figure 3:
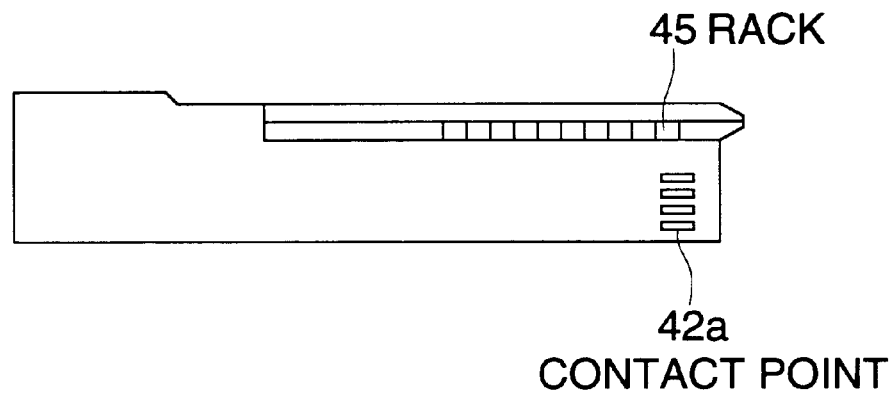
FIG. 3 is a diagram showing an example of the external structure of carrier 3.

FIG. 1 is a block diagram showing an example of the electric structure in an example of the invention, and FIG. 2 is a diagram showing an example of the mechanical structure in an example of the invention. FIG. 2 represents a perspective view. In FIG. 2, the numeral 30 is a film scanner (hereinafter referred to just as a scanner). The numeral 40 is a first film carrier (carrier 1) which holds 6 frames of J 135 piece film and is inserted in scanner 30, the numeral 41 is a second film carrier (carrier 2) which holds 4 frames of a mounted film and is inserted in scanner 30, and the numeral 42 is a third film carrier (carrier 3) which holds an IX-240 long roll film (film for photographic system) and is inserted in scanner 30. Unlike carriers 1 and 2, carrier 3 is of a cartridge structure that is shown in the drawing, and further is provided with mechanisms for film winding and film rewinding. On the side of the carrier 3, there is provided contact point 42a that is for exchanging signals with stage 32, as shown in FIG. 3. This contact point (connection terminal) 42a serves as communication terminals RXD and TXD which will be described later.

Carrier 1 is one for holding a piece film of 6 frames, while carrier 2 is one for holding four individual frames. Incidentally, the carriers 1 and 2 are the same in terms of their length and breadth dimensions, with only difference in the number of frames which they hold and in the method by which they are mounted. The numeral 48 is a film frame mounted in the first film carrier (hereinafter referred to simply as a carrier) 40, while 49 is a film frame mounted in the second film carrier 41. In the carrier 2, the numeral 49a is a holding member that holds film frame 49. The numeral 31 is a carrier inlet provided in scanner 30. The numeral 32 is a stage which supports carriers 40, 41 and 42 provided in the scanner 30 and moves them.

The numeral 43 is a rack formed on the side of the carrier 1, the numeral 44 is a rack formed on the side of the carrier 2, and 45 is a rack formed on the side of the carrier 3. The numeral 33 is a pinion provided in the scanner 30, and a rack-and-pinion gear is formed by these racks and pinion. In the scanner 30, the numeral 34 is a lamp that illuminates a frame of a film mounted on the scanner 30, the numeral 35 is a mirror that reflects image information formed by light emitted from the lamp 34 and transmitted through a film, 36 is a lens that converges reflected light coming from the mirror 35, and 37 is a CCD which receives light signals converged by the lens 36 and converts them into electric signals. The lamp 34 is provided for each of R, G and B, and CCD 37 is a line CCD for the monochromatic use which receives color information that corresponds to each of R, G and B in accordance with a lamp that is switched in succession. Each time a stepping motor advances a frame by one step, color information is first read through R irradiation, then color information is read through G irradiation and color information is read through B irradiation, which is repeated.

Incidentally, in carrier 3, there is loaded cartridge 46 enclosing a processed film so that frames can be advanced one frame at a time (auto-loading) by the conveying mechanism.

An apparatus shown in FIG. 1 is composed of scanner section 30 and personal computer section 60. In the scanner section 30, the numeral 1 represents a CPU that controls overall operations. RXD and TXD represent communication terminals for data communication which are connected with carrier 3, and they are connected to CPU 1. The numeral 2 is a power supply circuit for generating the power supply which is supplied to a circuit from the A.C. power supply, and the power supply circuit 2 is provided thereon with switch SV for turning the power supply circuit 2 on. SW 1 is a reset switch for resetting CPU 1.

The numeral 4 is a data communication section for exchanging data with a personal computer, and an example thereof to be used is an SCSI interface. The numeral 37 is a CCD that reads image information from a film and converts them into electric signals, and 5 is a CCD driver that drives the CCD 37. A line CCD as shown in FIG. 2 is used as the CCD 37. The numeral 6 is an A/D conversion circuit that converts image signals read from the CCD 37 into digital image data.

The numeral 34 is a lamp for illuminating a film, and 7 is a lamp driver that drives the lamp 34. The lamp driver 7 is connected to CPU 1, and is so arranged as to drive lamp 34 provided for each of R, G and B. The numeral 8 is a first stepping motor (SM 1) that drives aforesaid rack-and-pinion mechanism, 9 is a second stepping motor that drives stage 32, the numeral 10 is a stepping motor driver that controls the stepping motors 8 and 9.

Figure 4:
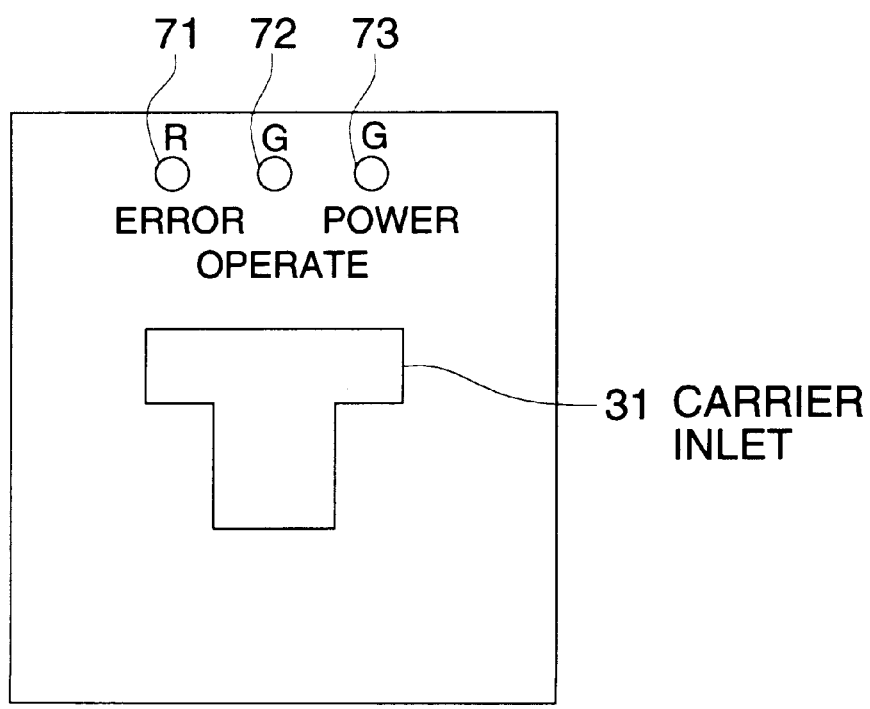
FIG. 4 is a front view of a scanner.

The numeral 70 is an LED driver driven by the CPU 1, the numeral 71 is an LED indicating an error, 72 is an LED indicating operations, and 72 is a power monitor LED. An LED in red (R), for example, is used as LED 71, an LED in green (G), for example, is used as LED 72, and an LED in green (G), for example, is used as LED 73, respectively, which are driven by LED driver 70. These LEDs 71–73 are provided on the front side of the scanner 30 as shown in FIG. 4.

The numeral 11 is first detection circuit A that detects a position of a carrier, and 12 is second detection circuit B that detects a position of a carrier. These detection circuits 11 and 12 are those for setting an initial position when the first carrier 40, the second carrier 41 or the third carrier 42 is inserted in the scanner 30.

In the personal computer section 60, the numeral 20 is a CPU that controls overall operations, and 20a is a memory which is provided in the CPU 20 and stores the read image data. In the memory 20a, there are stored, in advance, the number of frames to be indicated according to the type of a film which is read through pre-scanning and is to be displayed on a display means, and color correction data (e.g., three-dimensional LUT). The numeral 21 is a data communication section for exchanging data with scanner section 30, and the numeral 22 is an operation section that gives commands of various operations to CPU 20, and a key board or a mouse, for example, are used. The numeral 23 is a video memory which stores image data obtained through reading from a film, and 24 is a CRT serving as a display means which constantly displays image data stored in the video memory 23.

Figure 5:
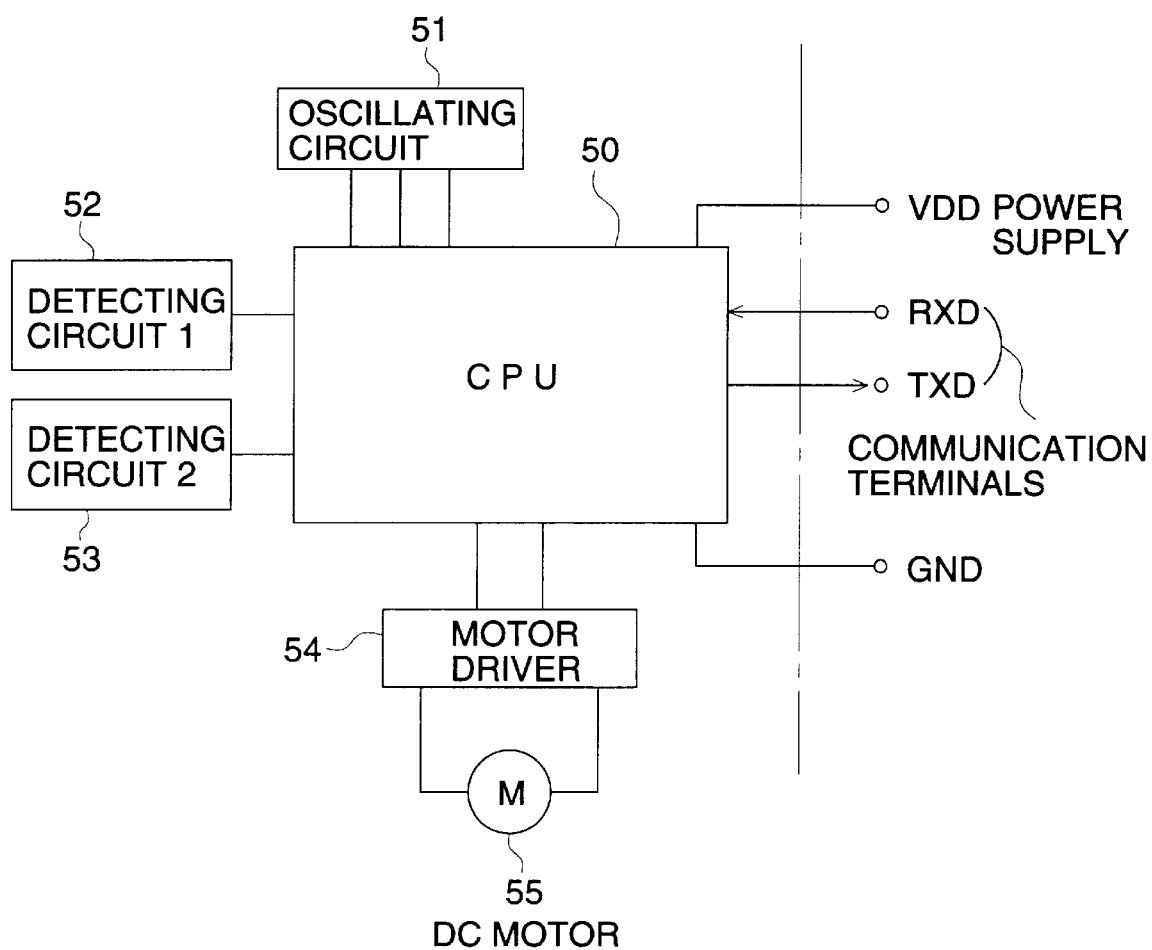
FIG. 5 is a block diagram showing an example of the electric structure of the carrier 3.

FIG. 5 is a block diagram showing an example of the electric structure of the carrier 3. This unit is so arranged as to be supplied with power from scanner 30 when the unit is inserted into the scanner 30. VDD and GDN terminal in the drawing represent it. In the drawing, 50 is a CPU that controls overall operations, 51 is an oscillation circuit that gives an operation clock to the CPU 50, the numeral 52 is a first detection circuit that detects perforations of a film when a frame is advanced, and 53 is a second detection circuit that detects a termination position of a film. The numeral 54 is a motor driver that receives control signals from CPU 50, and 55 is a D.C. motor which is driven by the motor driver 54 to be the source of driving for film winding and film rewinding. RXD and TXD represent communication terminals which are connected to CPU 1 (see FIG. 1) in the scanner 30 to exchange information. Operations of the apparatus constituted in the above manner are explained as follows.

(A) Automatic recognition operation for film type

Figure 6:
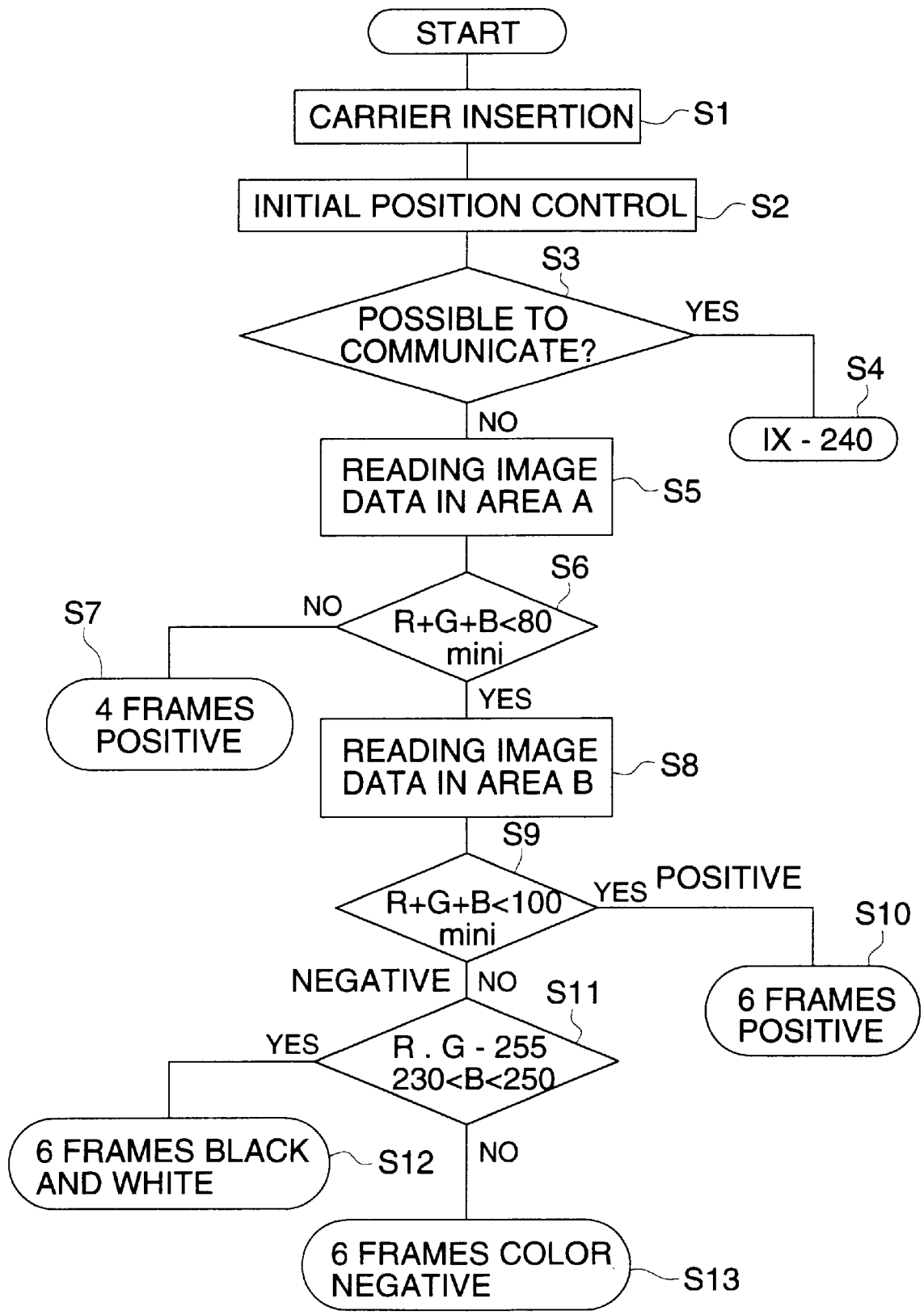
FIG. 6 is a flow chart showing an example of a film automatic recognition operation of the invention.

FIG. 6 is a flow chart showing an example of a film automatic recognition operation of the invention. In a premise of this operation, the standard condition for reading is that a film is a color negative film. In that condition, data accumulation condition (power of a lamp, accumulation time of CCD and gain of an amplifier etc.) is so established as to satisfy that an output result of color separation is almost in the vicinity of the maximum value of the output data and each of the color separation data is mostly the same each other. Due to this, it is possible to discriminate the type of a film by comparing the film with the color negative film in terms of image data, with the standard reading condition that is for the color negative film.

Figure 7:
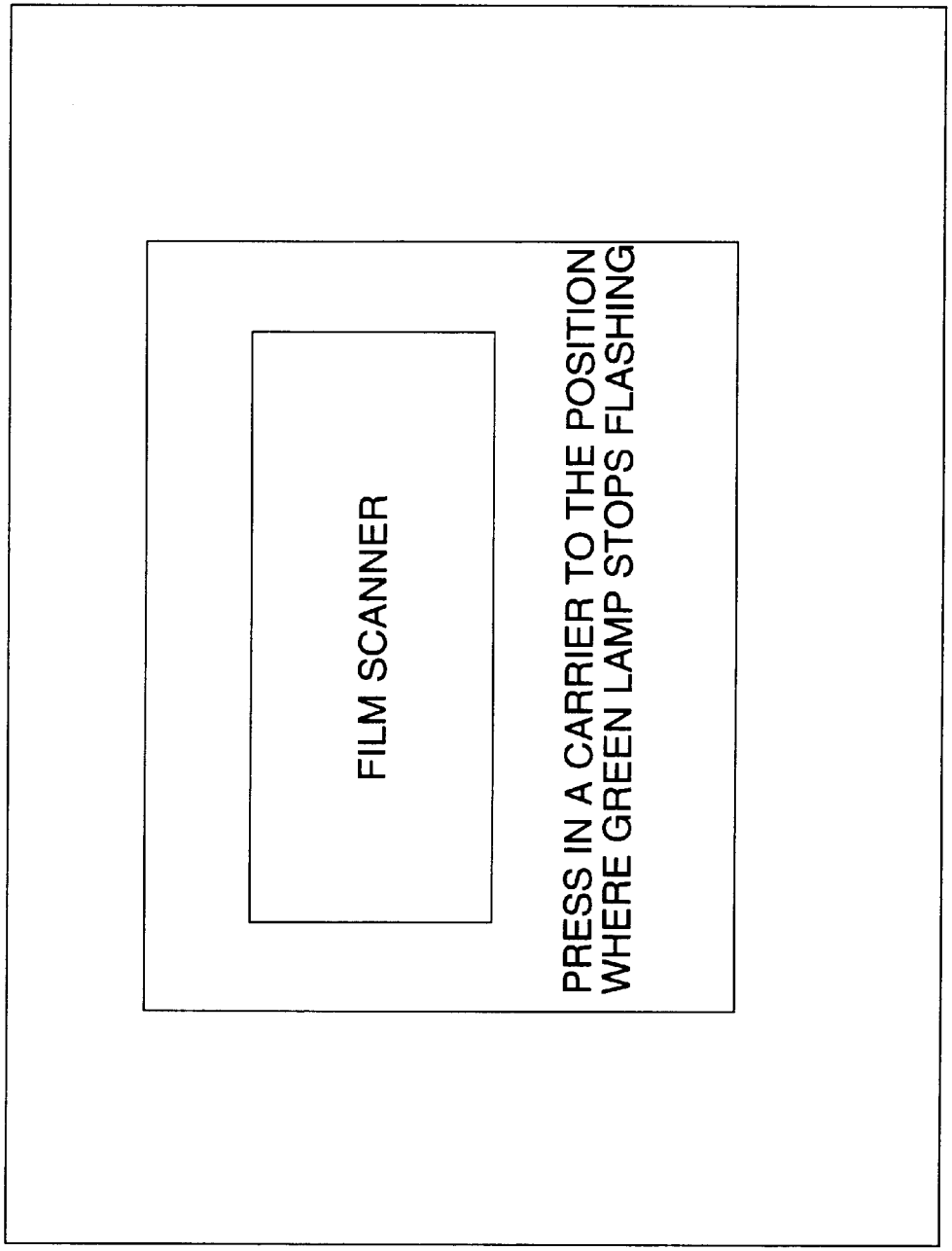
FIG. 7 is a diagram showing an example of display image screen of a CRT.

Now, the power supply for the scanner section 30 and for the personal computer section 60 is turned on, CPU 1 of the scanner section drives LED driver 70 to cause operation status LED 72 to blink. Simultaneously with that, a message of "Press in the carrier up to the position where a green lamp stops blinking" as shown in FIG. 7 is displayed on CRT 24 of the personal computer 60. Under this condition, when an operator inserts a prescribed carrier (S 1), detection circuit 11 notifies that a carrier has been inserted to CPU 1 which then turns operation status LED 72 off. Then, the apparatus goes to the initial position setting mode, and the initial position of the carrier is controlled (S 2).

(1) Initial position control operation of a carrier

Figure 8:
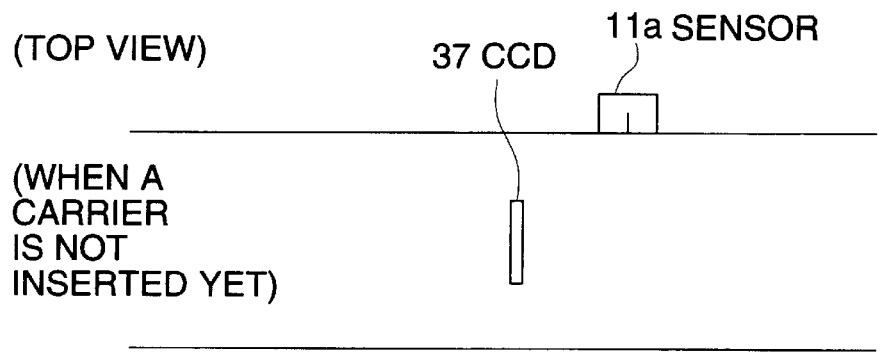
FIG. 8(a)–FIG. 8(c) represent an illustration for setting operation for an initial position of carrier 1.
Figure 8:
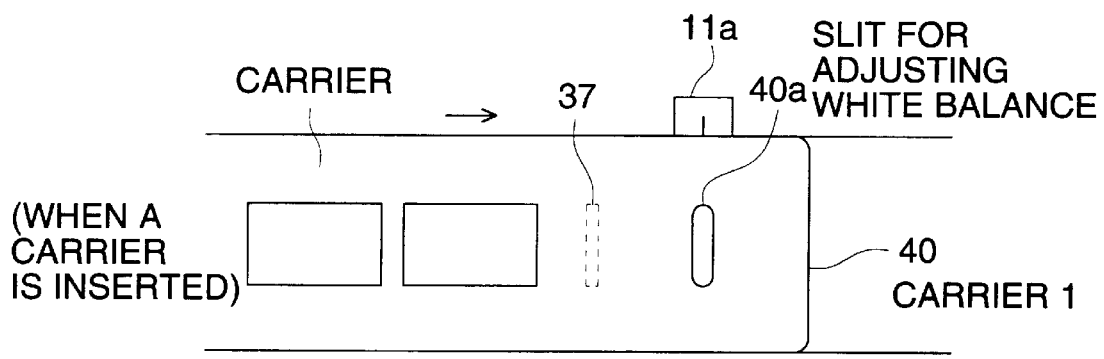
Figure 8:
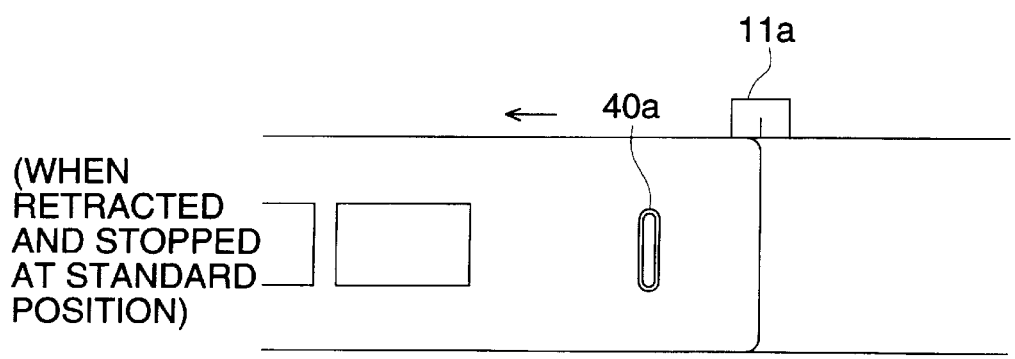

FIGS. 8(a)–8(c) represent an illustration for the initial position setting operations for carrier 1, and a top view of scanner 30 is shown. FIG. 8(a) shows the state wherein the carrier has not been inserted, FIG. 8(b) shows the state wherein the carrier has been inserted, and FIG. 8(c) shows the state wherein the carrier has been set to the standard position. In FIG. 8(a), the symbol 11a represents a position detection sensor which constitutes a part of detection circuit A and detects a carrier, and a photoreflector (P/R), for example, is used for that. The numeral 37 is a CCD described above.

Under this condition, carrier 1 is inserted as shown in FIG. 8(b). FIG. 8(b) shows the state wherein the carrier 1 is inserted in the appropriate position. The symbol 40a is a white balance adjusting hole that is provided on the carrier 1. Under this condition, position sensor 11a detects that the carrier 1 has been inserted and notifies it to CPU 1. The CPU 1 drives stepping motor 8 so that the rack-and-pinion mechanism may cause the forefront position of the carrier 1 to come to the position of the position sensor 11a (standard position).

Insertion of carrier 2 is also Detected in the same manner as in the case of the carrier 1.

Figure 9:
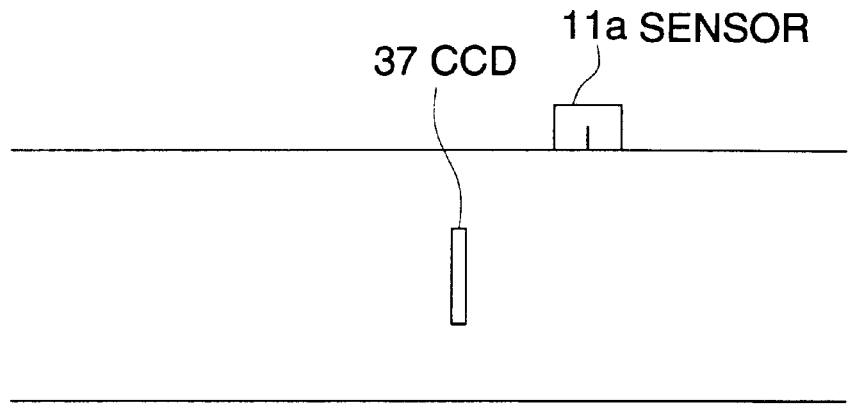
FIG. 9(a)–FIG. 9(c) represent an illustration for setting operation for an initial position of carrier 3.
Figure 9:
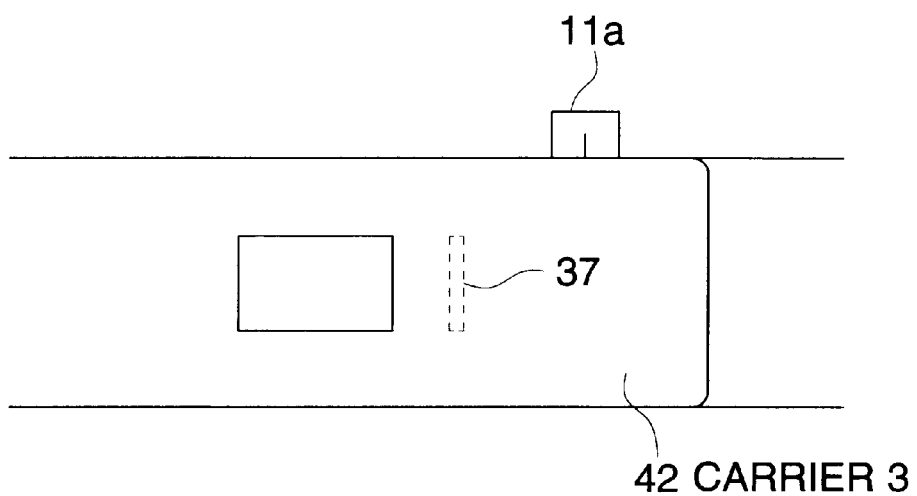
Figure 9:
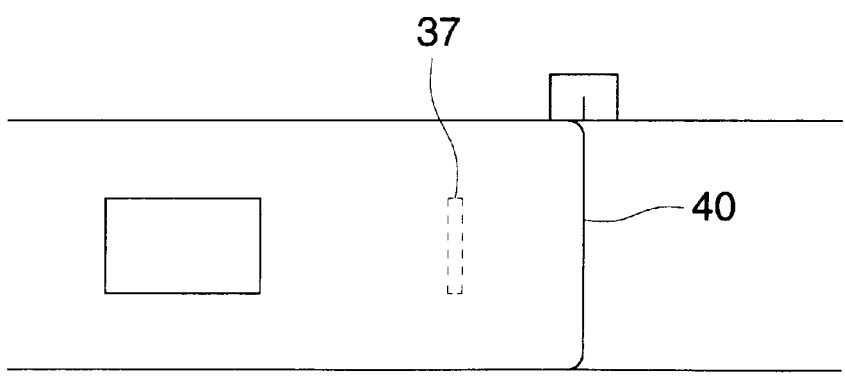

FIGS. 9(a)–9(c) represent an illustration for the initial position setting operations for carrier 42 (carrier 3), and a top view of scanner 30 is shown. FIG. 9(a) shows the state wherein the carrier has not been inserted, FIG. 9(b) shows the state wherein the carrier has been inserted, and FIG. 9(c) shows the state wherein the carrier has been set to the standard position. In FIG. 9(a), the symbol 11a represents a position detection sensor which constitutes a part of detection circuit A and detects a carrier, and a photoreflector, for example, is used for that. The numeral 37 is a CCD described above.

Under this condition, carrier 3 is inserted as shown in FIG. 9(b). FIG. 9(b) shows the state wherein the carrier 3 is inserted in the appropriate position. Under this condition, position sensor 11a detects that the carrier 3 has been inserted and notifies it to CPU 1. The CPU 1 drives stepping motor 8 so that the rack-and-pinion mechanism may cause the forefront position of the carrier 3 to come to the position of the position sensor 11a (standard position). Due to this, the initial position is set to the point to which the carrier is moved for a prescribed length by a carrier driving means, and at this point, the connection terminal of the scanner and that of the carrier are just connected to make communication possible.

(2) Discrimination of IX-240 film

Next, under the condition that the carrier is set to its initial position, CPU 1 checks whether communication with the inserted carrier is possible or not (S 3). Under this state, the communication terminal of carrier 3 and that of scanner section 30 are connected with each other. This checking is carried out by sending data to the carrier through communication terminals RXD and TXD, and by reading the response message coming from the carrier. If the response data from the carrier is returned, it is possible to recognize that the film loaded in the carrier is an IX-240 film (S 4). Owing to the foregoing, since the carrier equipped with a film transport mechanism is provided with a connection terminal for exchanging signals with a scanner, it is possible to conduct communication between the scanner and the carrier through the connection terminal, and thereby to discriminate carrier 3 when communication is possible, and to discriminate carriers 1 and 2 when communication is impossible. CPU 1 notifies the discrimination results to CPU 20 of personal computer section 60 through data communication section 4.

Figure 10:
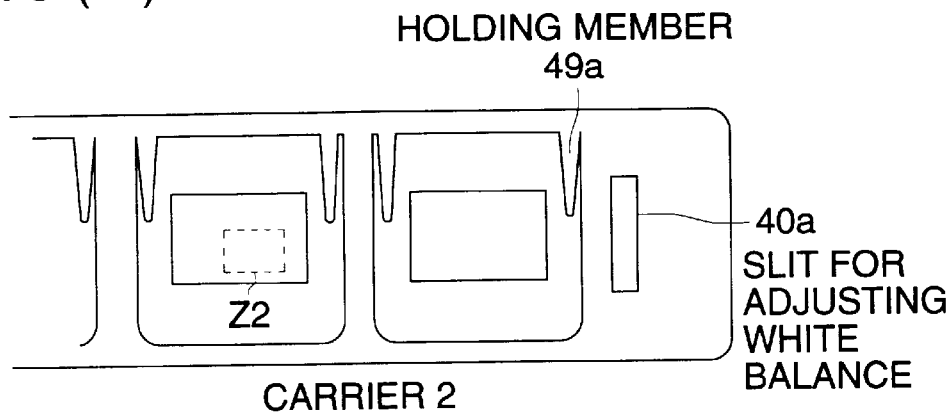
FIGS. 10(a) and 10(b) represent an illustration for area A.
Figure 10:
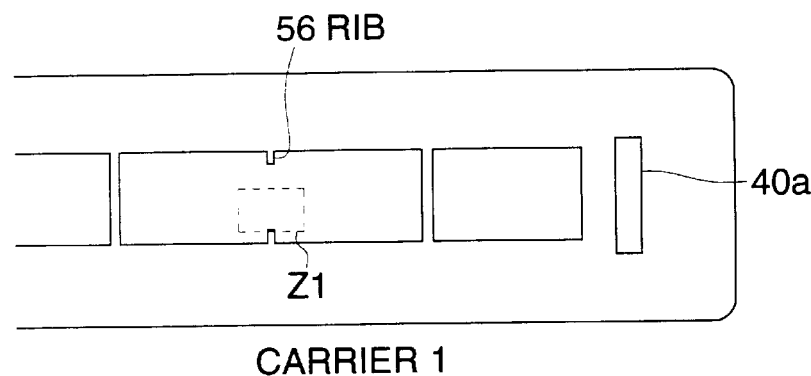

When communication is impossible, the carrier inserted is supposed to be either carrier 1 or carrier 2. So, CPU 1 reads image data on area A of the film (S 5). To be concrete, signals obtained by CCD 37 through its reading are converted into digital image data by A/D converting circuit 6, and then are given to CPU 1. FIGS. 10(a) and 10(b) represent an illustration of area A. FIG. 10(a) shows carrier 2 and FIG. 10(b) shows carrier 1.

Figure 11:
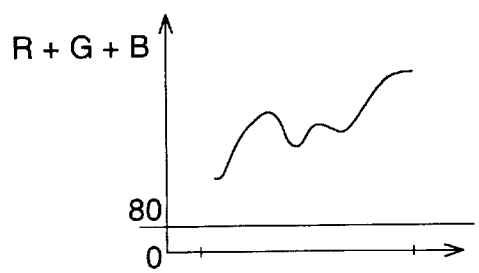
FIGS. 11(a) and 11(b) represent a diagram showing an example of data characteristics of area A for each type of film.
Figure 11:
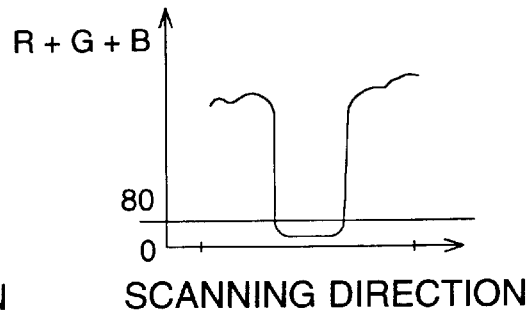

In carrier 1, Z 1 represents area A where rib 56 is provided. In carrier 2, Z 2 represents area A where a rib like one in the carrier 1 is not provided. Incidentally, the carrier 1 and the carrier 2 are the same each other in terms of dimensions, and their initial positions to be set are also the same. When a carrier driving means (rack-and-pinion) moves these carrier 1 and carrier 2 by a predetermined amount, the carrier 1 stops at the point where the rib exists, while the carrier 2 stops at the point showing the area A that faces the carrier 1. When aforesaid area A is read by CCD 37, therefore, output characteristics are those shown in FIG. 11(b) in the case of 6-frame carrier (carrier 1), while output characteristics are those shown in FIG. 11(a) in the case of 4-frame carrier (carrier 2). In FIGS. 11(a) and 11(b), the axis of ordinate represents R+G+B brightness data, and the axis of abscissa represents the scanning direction. Image data are shown in 8-bit (256 gradations) for each color. Due to this, by reading with R, G and B representing the three primary colors of light, discrimination of a film is made easy. Owing to this, the value of image data obtained by an image reading means through its reading varies depending on whether the first prescribed area is an image or a partition portion, which makes it possible to discriminate between the first film carrier and the second film carrier.

In the case of the 6-frame carrier, its output characteristics are those which fall greatly as shown in FIG. 11(b), because a portion where rib 56 exists does not transmit light. To the contrary, in the case of the 4-frame carrier, its output characteristics do not fall and take a certain value as shown in FIG. 11(a), because no rib exists. Owing to this, when the area A is sampled at the same pitch and the sum of color separation brightness data obtained through reading is plotted, distribution is divided vertically into an upper portion and a lower portion on both sides of threshold value 80. It is therefore possible to discriminate the type of a film between a mounted film and a piece film.

(3) Discrimination of 4-frame positive film

When R+G+B data are observed under the condition mentioned above, the minimum value of the output is smaller than the threshold value 80 in the case of a 6-frame carrier, while the minimum value of the output is greater than the threshold value 80 in the case of a 4-frame carrier. Therefore, CPU 1 judges whether the minimum value of image data obtained from area A through reading is smaller than 80 or not (S 6). When the minimum value of image data obtained through reading is smaller than 80, it means a carrier having a rib, and the occasion of carrier 1 (color negative film, color positive film, or black and white (B/W) negative film as the type of a film) is recognized. When the minimum value of image data obtained through reading is greater than 80, it is recognized to be a 4-frame positive film (S 7). When carrier 1 or carrier 2 is recognized by CPU 1 under the condition mentioned above, cutout ribs provided between frames of a film and prescribed area A around the cutout ribs are read by an image reading means so that image data obtained through the reading are compared. Then, in the case of a piece film, brightness data are small because a knob is owned, while in the case of a mounted film other than the piece film, brightness data are great because no knob is owned. It is therefore possible to discriminate between a mounted film and a piece film by comparing data of image reading. Results of this discrimination are notified to CPU 20 of personal computer section 60 from data communication section 4. Owing to this, the type of a film can be discriminated, which makes it possible to apply color correction of a color positive film to the discriminated film (mounted film), and thereby to obtain an optimum image data.

(4) Discrimination of the type of 6-frame film

Figure 12:
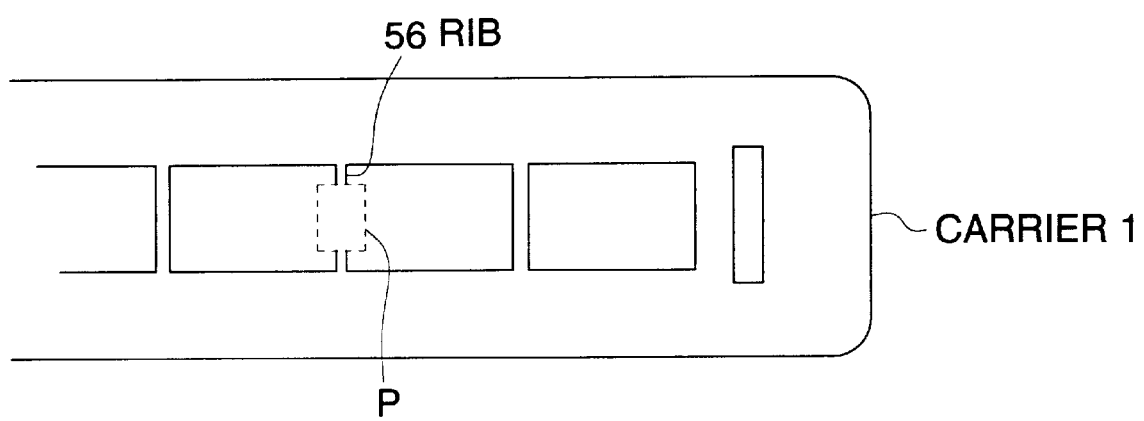
FIG. 12 represents an illustration for area B.

Next, CPU 1 enters operations for discriminating a 6-frame film whether it is a color positive film, a color negative film or a black and white negative film. The CPU 1 reads image data of area B on a film (S 8). To be concrete, signals obtained by CCD 37 through its reading are converted into digital image data by A/D converting circuit 6, and then are given to CPU 1. FIGS. 12 represents an illustration of area B. Area P interposed between ribs 56 in the drawing represents the area B. This area B is an unexposed area (base portion) which is transparent in orange for a color negative film, black for a color positive film and bluish for a black and white negative film. Due to this, brightness on the unexposed portion varies depending on the type of a film. Therefore, it is possible to discriminate the type of a film based on brightness for each separated color obtained by a scanner through its reading.

FIG. 13(1)–FIG. 13 (4) each represent a diagram showing an example of data characteristics of area B on various types of films. Output is shown on an 8-bit (256) basis. Characteristics of R+G+B on a 6-frame color positive film are shown in (1), and characteristics of R+G+B on a 6-frame color negative film or a 6-frame black and white negative film are shown in (2). As stated above, area B is dark on a 6-frame color positive film. Therefore, output of CCD 37 is low, and its minimum value is smaller than the threshold value 100. To the contrary, area B is bright in the case of a 6-frame color negative film and a 6-frame black and white negative film. Therefore, output of CCD 37 is high, and its minimum value is greater than the threshold value 100.

With the foregoing as a background, CPU 1 checks whether the minimum value of R+G+B is smaller than the threshold value 100 or not (S 9). When the minimum value of R+G+B is smaller than the threshold value 100, it is understood that the 6-frame film is a positive film (S 10). When R+G+B is greater than the threshold value 100, the 6-frame film is a color negative film or a black and white negative film. When it is a color negative film, its output characteristics are at about 240 to be mostly equal for R, G and B as shown in FIG. 13 (3), because R, G and B characteristics are adjusted to be the best for a color negative film, as stated above. To the contrary, in the case of a black and white negative film, R and G are saturated (255 or more) and B only is within a range of 230–250, as shown in FIG. 13 (4). This characteristic is utilized for discrimination between a color negative film and a black and white negative film. Due to this, it is possible to discriminate quickly between a black and white negative piece film and a film other than the black and white negative piece film (color negative film naturally), by reading prescribed area B with an image reading means, programming image data of results of the reading for each color, and by comparing and referring by the use of threshold values 230, 250 and 255.

CPU 1 checks whether the conditions of R=G=255 and 230<B<250 are satisfied or not (S 11). When these conditions are satisfied, it is judged that the film is a 6-frame black and white negative film (S 12). In other cases, the film is unconditionally discriminated to be a 6-frame color negative film (S 13). The results of the discrimination are notified to CPU 20 of personal computer section 60 from CPU 1 through data communication section 4.

In the present example, when area B between the cutout ribs is sampled at the same pitch by an image reading means to plot the sum of the color separation brightness data, the distribution is divided vertically on both sides of the center represented by the threshold value 100. Therefore, the film type can be discriminated between a color positive piece film and a color negative piece film or a black and white negative piece film.

Since the type of a film can be discriminated, it is possible to apply the color correction for a color positive film to the discriminated film (color positive film) and thereby to obtain the optimum image data. Further, it is possible to discriminate quickly between a black and white negative piece film and a film other than the black and white negative piece film, by reading area B at the same pitch with an image reading means, plotting image data of results of the reading for each color, and by comparing and referring by the use of threshold values 230, 250 and 255. Furthermore, since the type of a film can be discriminated, it is possible to apply the color correction for a color negative film to the discriminated film (color negative film) and thereby to obtain the optimum image data.

In the example mentioned above, discrimination among a color negative film, a color positive film and a black and white negative film in the case of a 6-frame film has been taken as an example. On the other hand, an IX-240 film was discriminated in step S 4, and even when discriminating the type of the film whether it is a color negative film, a color positive film or a black and white negative film, it is possible to use the sequence of steps S 6–S 13 in FIG. 6.

In the first example of the invention, it is possible to conduct color correction and/or control and/or display each corresponding to the film, because the color correction, the control method and the display vary depending on each type of the film discriminated.

(B) Pre-processing operations for pre-scanning

When a film is an IX-240 film, there are an occasion wherein all film frames are taken up in cartridge 46 and an occasion wherein all film frames are not taken up in cartridge 46. When all film frames are not taken up, white balance is to be conducted through the film, which results in erroneous white balance adjustment. For eliminating such troubles, it is necessary for all frames to be taken up in cartridge 46, when all frames are not taken up.

Figure 14:
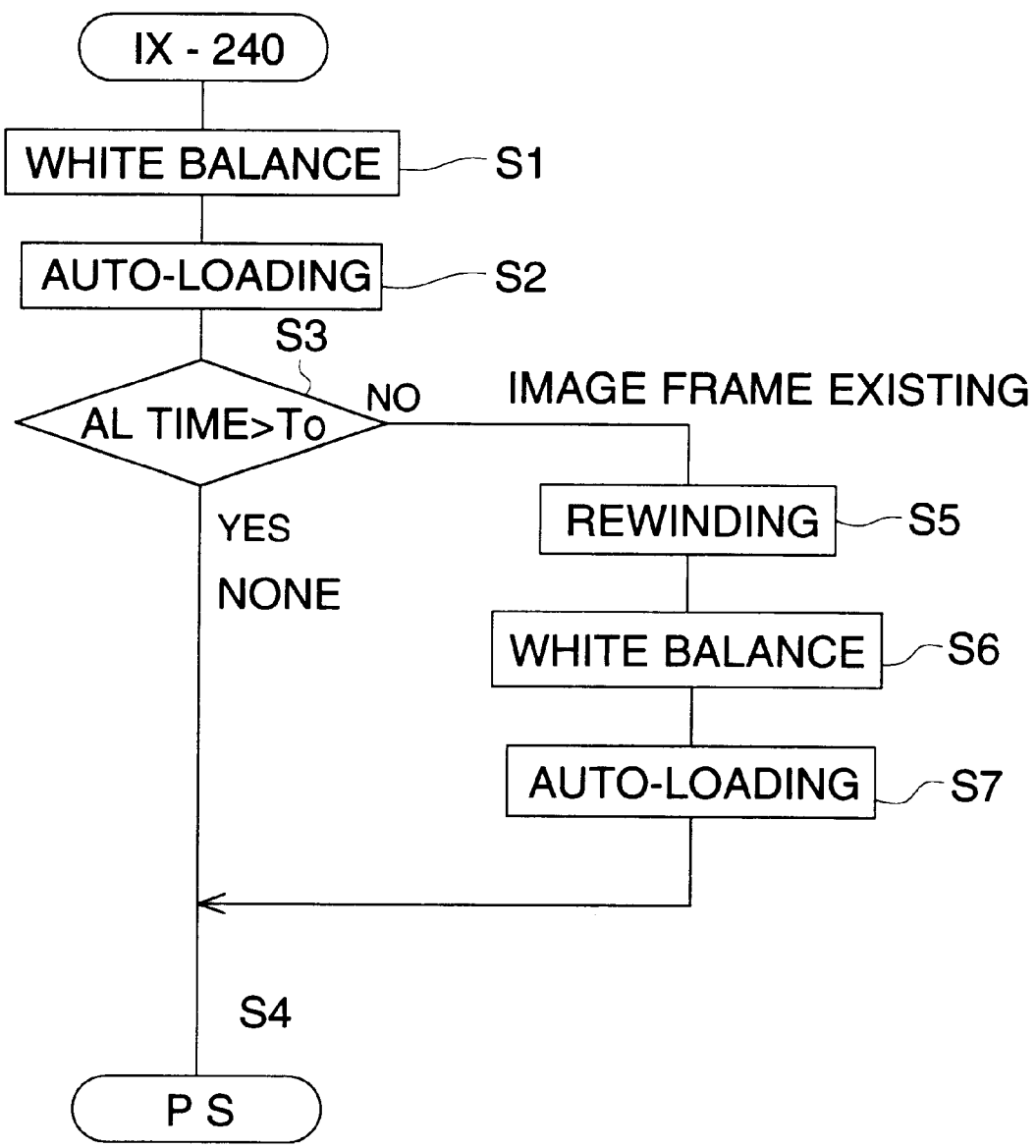
FIG. 14 is a flow chart showing an example of pre-processing operations for pre-scanning.

FIG. 14 is a flow chart showing an example of pre-processing operations for pre-scanning. First, white balance adjustment operations are carried out (S 1), and then auto-loading of a film (AL) is conducted (S 2). In this case, CPU 1 of scanner section 30 checks whether the time required for auto-loading is greater than threshold value T0 or not (S 3). When it is greater than the threshold value T0, it is judged that all frames have been wound into cartridge 46, because the time required for winding the film is supposed to be the prescribed time.

Figure 15:
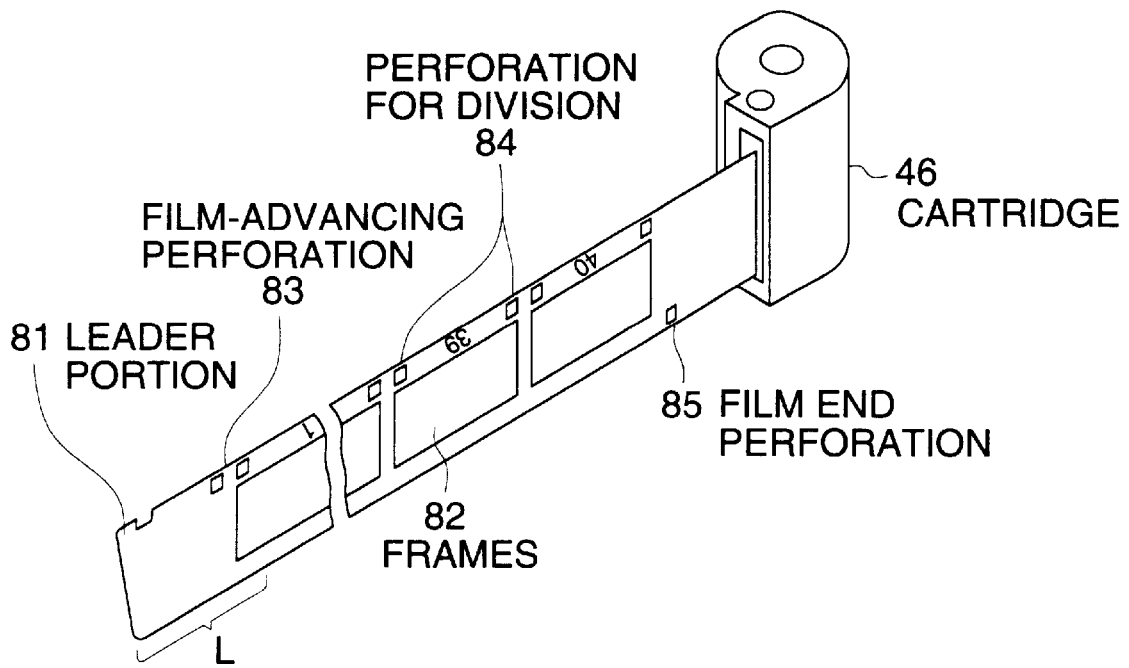
FIG. 15 is a diagram showing the state where IX-240 film is taken out.

An IX-240 film has on its tip leader section 81 whose length is equivalent to about 4 frames of the film as shown in FIG. 15. Accordingly, it takes time when conducting auto-loading from the state where all frames are wound into cartridge 46. To the contrary, when certain quantity of frames are taken out, the time required for auto-loading (the time required for advancing one frame, in this case) can be short. It is therefore understood that all frames are wound into, when the time for auto-loading is greater than the threshold value T0, and that frames are already drawn out, when the time for auto-loading is smaller than the threshold value T0, In FIG. 15, the numeral 82 is a frame, 83 is a perforation for film advancement (Fe), 84 is a perforation for partitioning frames (Fb), and 85 is a frame end perforation (Fc).

In step S 3, when the time required for auto-loading is shorter than T0, it means the state wherein frames are already drawn out, and in this state, white balance is carried out under the condition of transmission through the film, which is not appropriate. In this case, therefore, CPU 1 sends a command for rewinding to CPU 50 of carrier 3 through communication terminal TXD, and CPU 50 drives motor driver 54 so that film rewinding may be carried out by D.C. motor 55 (S 5). Completion of the film rewinding can be recognized by perforation signals which suspend to be generated. Then, the CPU 1 conducts white balance adjustment again (S 6), and executes auto-loading (S 7). Due to this, conditions for pre-scanning (PS) can be arranged (S 4). In step S 3, when the time required for auto-loading is longer than T0, it means that white balance adjustment in step S 1 and auto-loading in step S 2 are correct, which therefore starts pre-scanning immediately (S 4). Due to this, when the IX-240 film has not been rewound completely, it is possible to check whether or not the film has not been rewound completely, by measuring the time required for auto-loading. In this case, white balance adjustment can be conducted correctly because it is conducted again after the film has been rewound.

Figure 16:
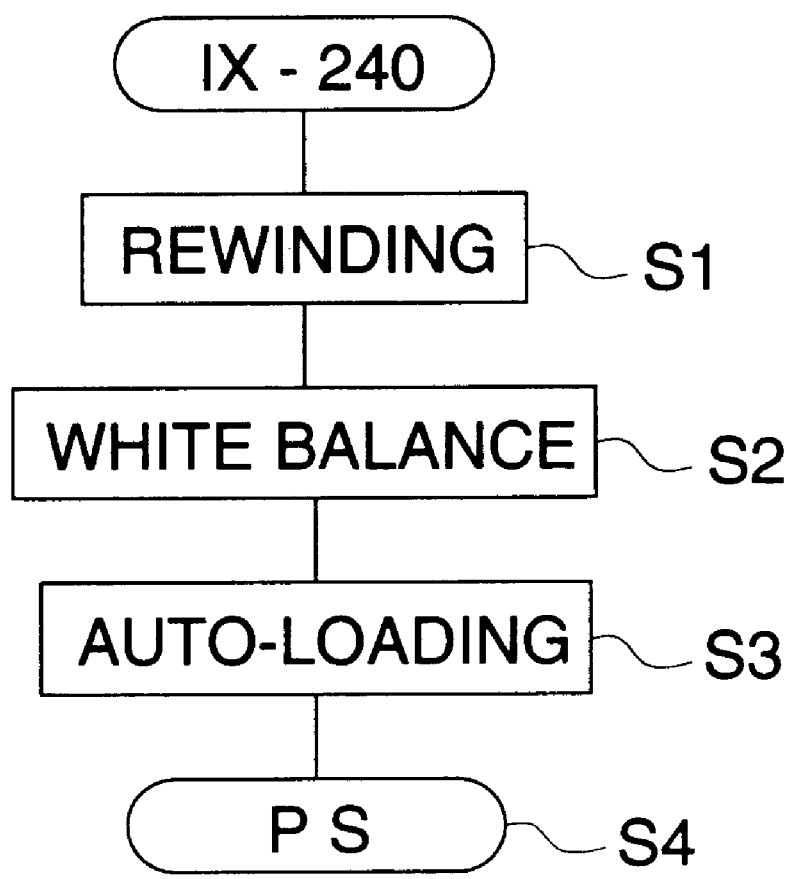
FIG. 16 is a flow chart showing another example of pre-processing operation for pre-scanning.

FIG. 16 is a flow chart showing another example of pre-processing operation for pre-scanning. In the example, film rewinding is carried out first regardless of the state of a frame (S 1), then white balance adjustment is conducted (S 2), and auto-loading is executed (S 3) to conduct pre-scanning (PS) (S 4). Processing in this method is time-consuming because film rewinding is conducted in all cases.

Figure 17:
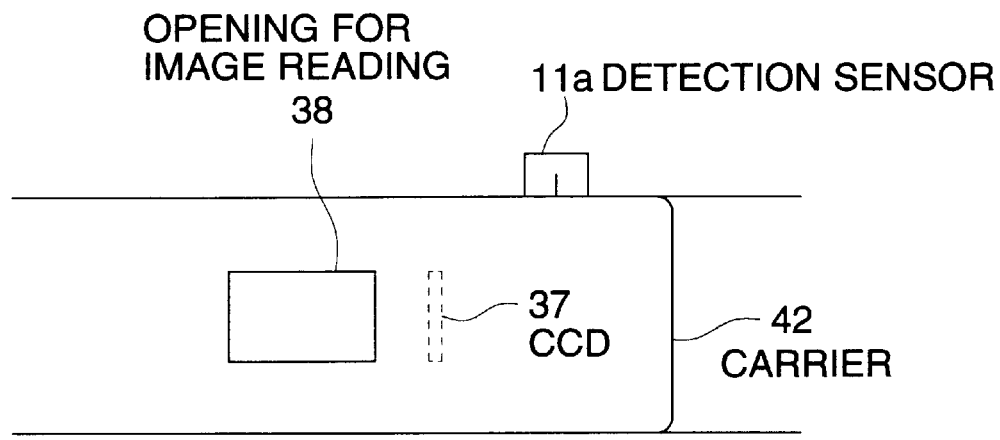
FIGS. 17(a)–17(c) represent an illustration for white balance adjusting operation.
Figure 17:
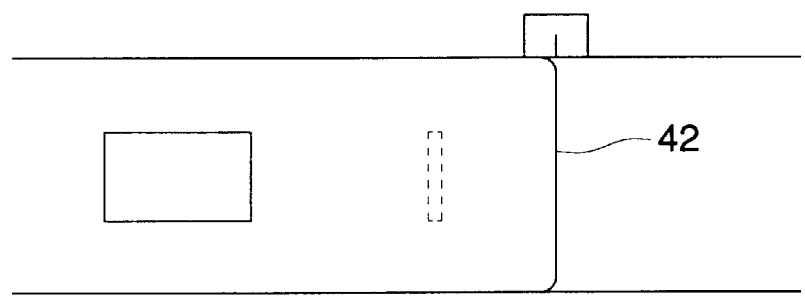
Figure 17:
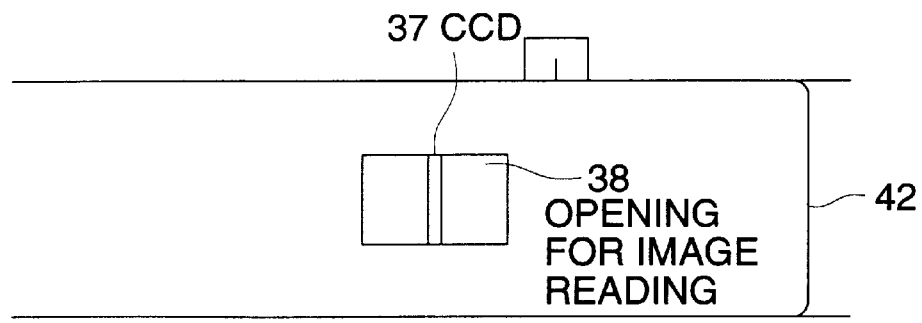
Figure 18:
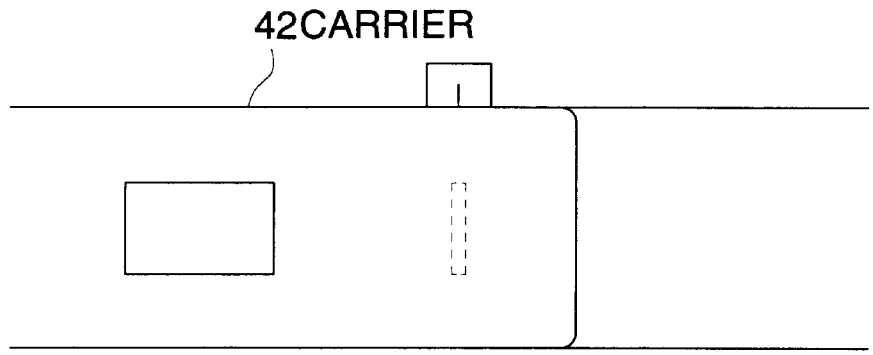
FIGS. 18(a)–18(c) represent an illustration for white balance adjusting operation.
Figure 18:
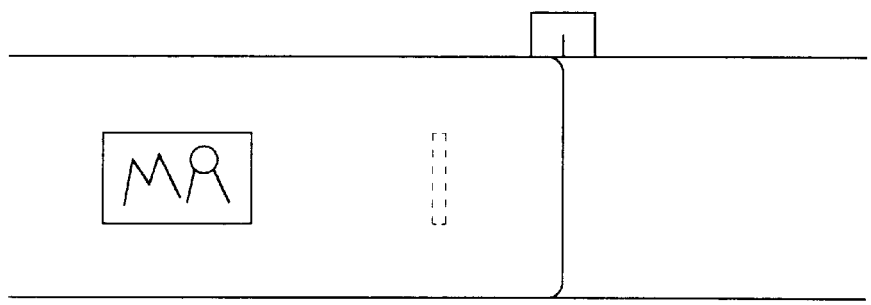
Figure 18:
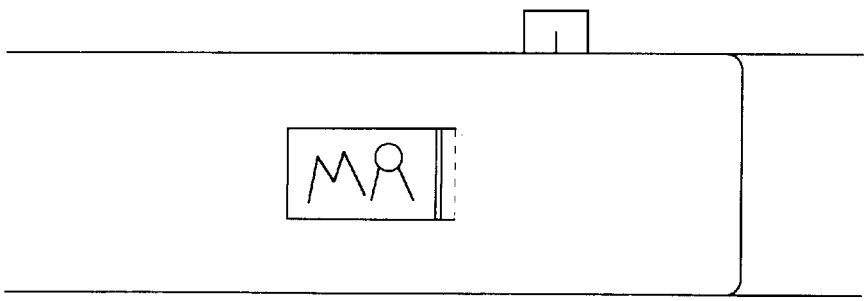

FIGS. 17(*a*)–17(*c*) and FIGS. 18(*a*)–18(*c*) represent a diagram showing operations of white balance adjustment in the case of carrier 3 (IX-240 film). In FIG. 17 (*a*), the symbol 11*a* is a photoreflector serving as a detection sensor, 37 is a CCD, and 38 is an opening for image reading. An operator inserts a carrier through carrier inlet 31. Photoreflector (P/R) 11*a* representing a detection sensor that is a part of detection circuit 11 detects whether the carrier has been inserted or not. When the photoreflector 11a detects that the carrier has been inserted, stepping motor 8 is driven so that carrier 42 may be retracted to its initial position by the rack-and-pinion mechanism, and the detection by the photoreflector 11a is checked whether is shows an output or not. When the photoreflector 11a does not show its output any longer, it means that the carrier 42 has reached the standard position. Therefore, the CPU 1 stops the carrier 42. FIG. 17 (b) shows the state wherein carrier 40 is stopped. Under this state, a communication terminal of cartridge 46 is connected to scanner section 30.

Next, under the state where the carrier 42 is stopped, communication is confirmed by the CPU 1. For the confirmation of communication, it is checked whether it is possible or not to communicate between the carrier 42 and scanner 30 by the use of communication terminals RXD and TXD (equipped on both the carrier and the scanner). When the communication is possible, white balance adjustment is then started, and this information is notified to CPU 1 from data communication section 21 through data communication section 4 of the scanner section. The CPU 1 drives stepping motor 9 for driving a stage so that stage 32 may be advanced by a prescribed length. FIG. 17(c) shows the state wherein the carrier 42 has been advanced by a prescribed length and opening for image reading 38 has come to the position that is right above CCD 37. Under this state, lamp 34 is lit so that CCD 37 is illuminated, and output of CCD 37 is read. Under this condition, white balance adjustment (output adjustment of the lamp and shading correction) of CCD 37 is conducted. To be concrete, light information data obtained through reading by CCD 37 are converted by A/D conversion circuit 6 into digital image data, and then are notified from data communication section 4 to CPU 20 of personal computer 60. The CPU 20 receives output data of CCD 37 and conducts operations of white balance adjustment. According to the present example, it is possible to conduct white balance adjustment by using opening for image reading 38 before pre-scanning, and yet a carrier can be made small in size and simple in structure.

After completion of white balance adjustment, CPU 1 drives stepping motor 9 to retract stage 32 by a prescribed length so that it may be carried to the standard position. FIG. 18(a) shows the state of the standard position. Then, CPU 50 in carrier 40 drives D.C. motor 55 to conduct film autoloading (film winding) (S 10). FIG. 18(b) shows the state of film winding, and FIG. 18(c) shows that the film image on the first frame coincides with opening for image reading 38 to be in the state of image reading. Under this condition, the CPU 1 conducts pre-scanning.

(C) Pre-scanning operations

Figure 19:
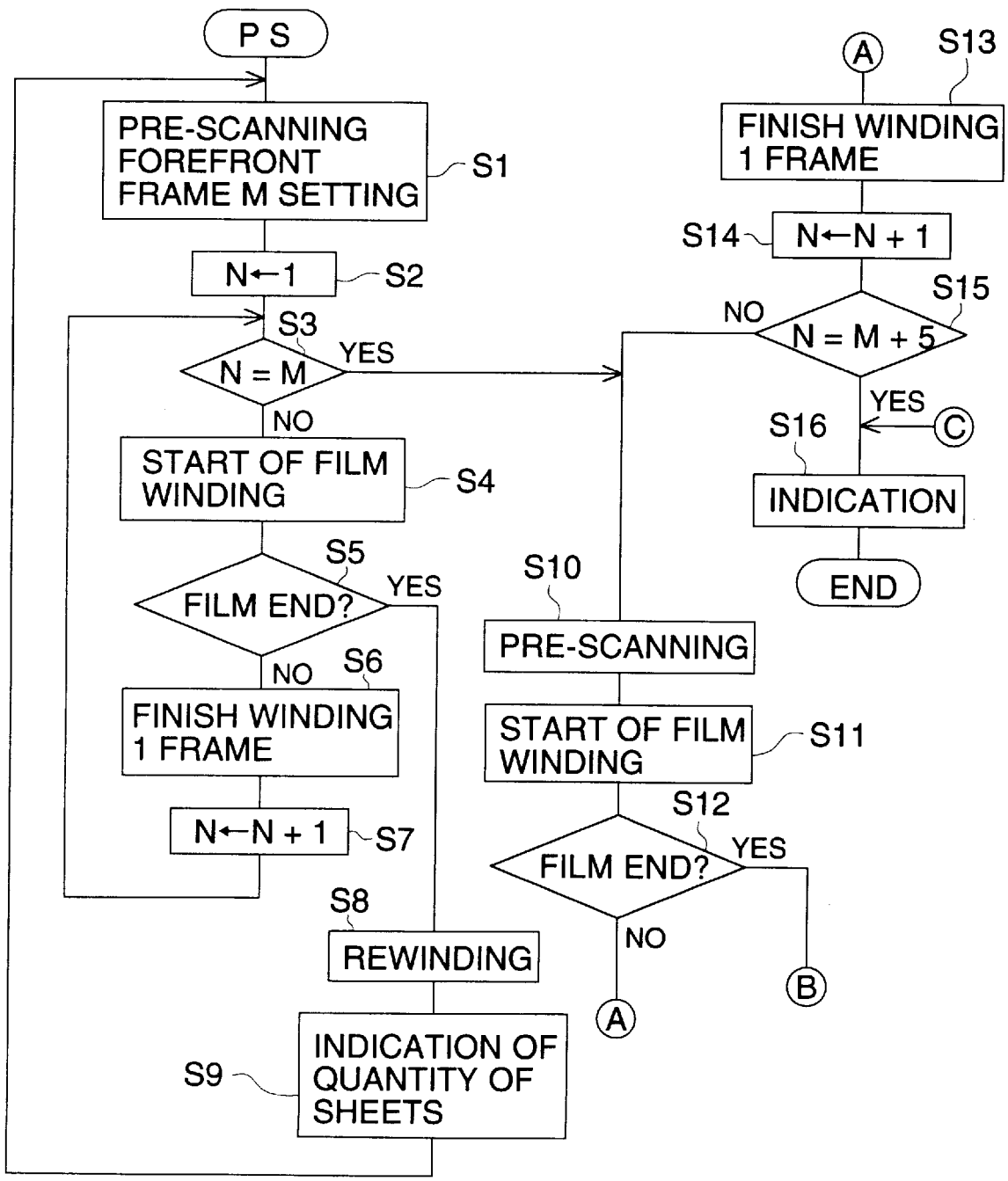
FIG. 19 is a flow chart showing an example of pre-scanning operation of carrier 3.
Figure 20:
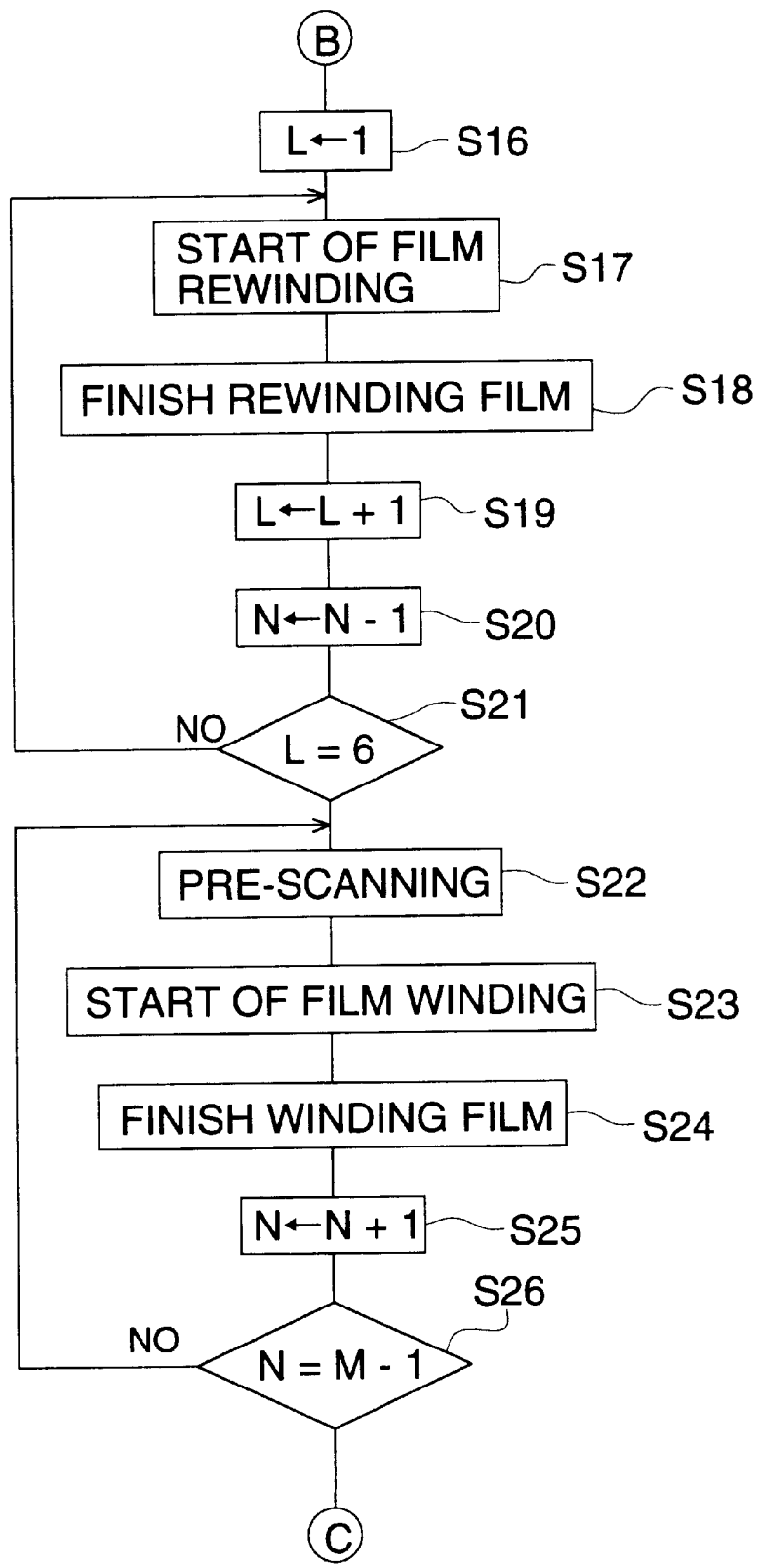
FIG. 20 is a flow chart showing an example of pre-scanning operation of carrier 3.
Figure 21:
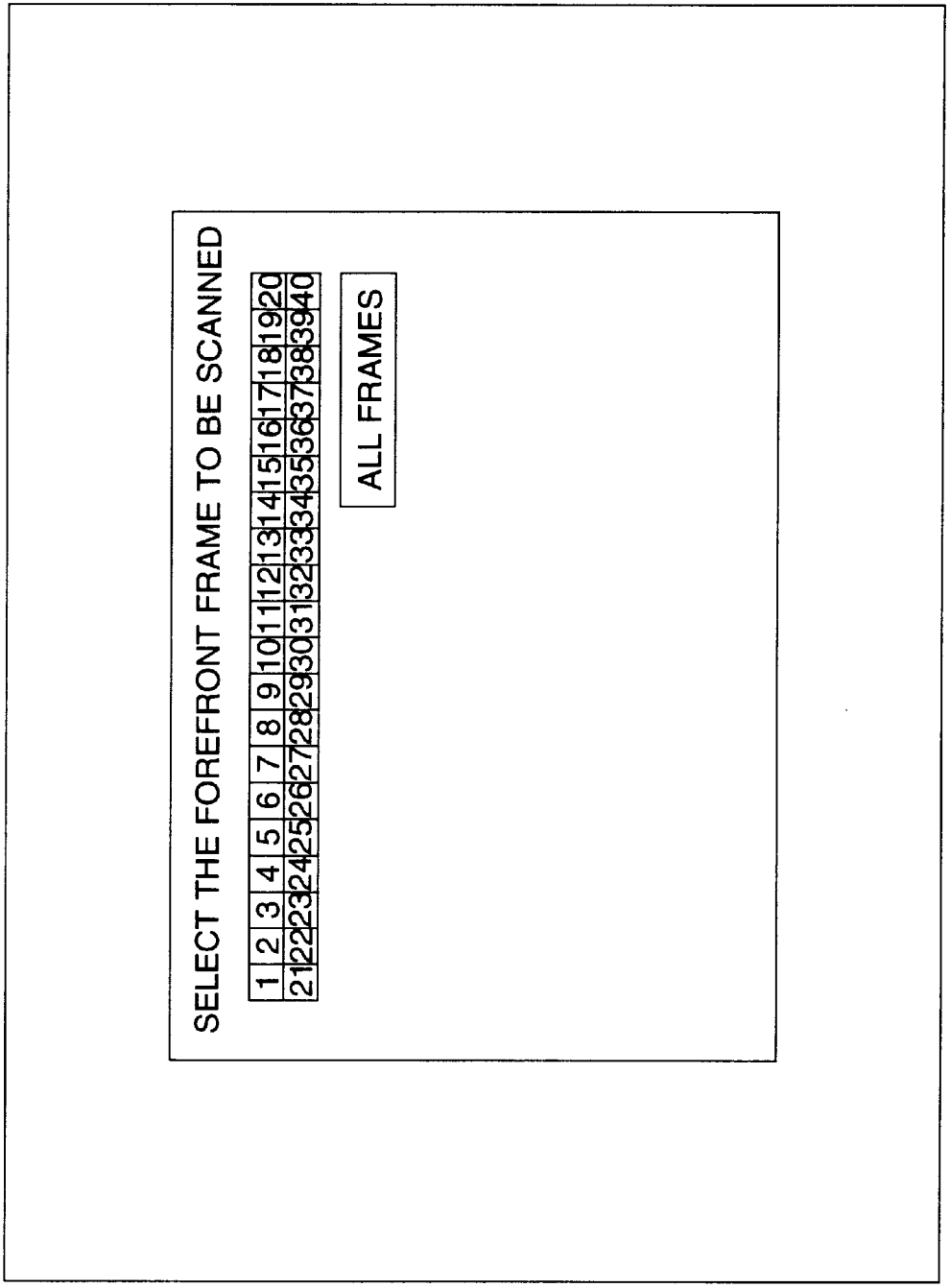
FIG. 21 is a diagram showing an example of display image screen of a CRT.

FIGS. 19 and 20 represent a flow chart showing an example of pre-scanning operations of carrier 3 (IX-240 film). In this case, there will be explained an example of 6-frame pre-scanning. An operator clicks the desired forefront frame from an image plane displayed on CRT 24, and sets forefront frame M for pre-scanning (S 1). A display on the CRT in this case is shown in FIG. 21. On the screen, there are displayed those up to 40 which is the maximum frame number of IX-240 film. The frame number of the IX-240 film includes 10 frames, 25 frames and 40 frames, for example, and 40 which is the maximum frame number is displayed in this case. This value M of the forefront frame is notified to CPU 1 of scanner section 30 from data communication section 21 of personal computer section 60. The CPU 1 establishes 1 as an initial value for counting a film (2). The reason for this is that auto-loading has been finished.

Here, the occasion of M=1 will be explained. CPU 1 checks whether N has become equal to M or not (S 3). In this case, CPU 1 conducts pre-scanning for carrier 3 because the condition of N=M=1 is satisfied (S 10). This pre-scanning operation is conducted after thinning frames, and it is for taking in image information. Image data thus taken in are notified to personal computer section 60 from data communication section 4 of scanner 30, and then are stored in memory 20a in CPU 20. Carrier 3 drives D.C. motor 55 so that film winding by one frame is started (S 11). Then, the CPU 1 checks whether a film end is observed or not (S 12). A perforation representing the film end can be recognized by detecting film end perforation 85 in FIG. 15. In this case, the film end has not come yet, and therefore, the D.C. motor 55 of the carrier 3 finishes film winding for one frame (S !3). The CPU 1 updates N by 1 (S 14).

Then, the CPU 1 checks whether the counted value N has become M+5 or not (S 15). Because of N=2 in this case, N has not become M+5 (=6) yet. Accordingly, the CPU 1 conducts pre-scanning of the second frame for carrier 3 (S 10). Image data thus read are notified to CPU 20 of personal computer section 60 from data communication section 4 of scanner section 30, and then are stored in memory 20a. Then, carrier 3 drives D.C. motor 55 to start film winding by one frame (S 11). Next, the CPU 1 checks whether a film end is observed or not (S 12). Since the film end has not come yet, the D.C. motor 55 of the carrier 3 finishes film winding for one frame (S 13). Then the CPU 1 updates N by 1 so that N=3 is achieved. The same operation is repeated until N=6 is achieved.

Figure 22:
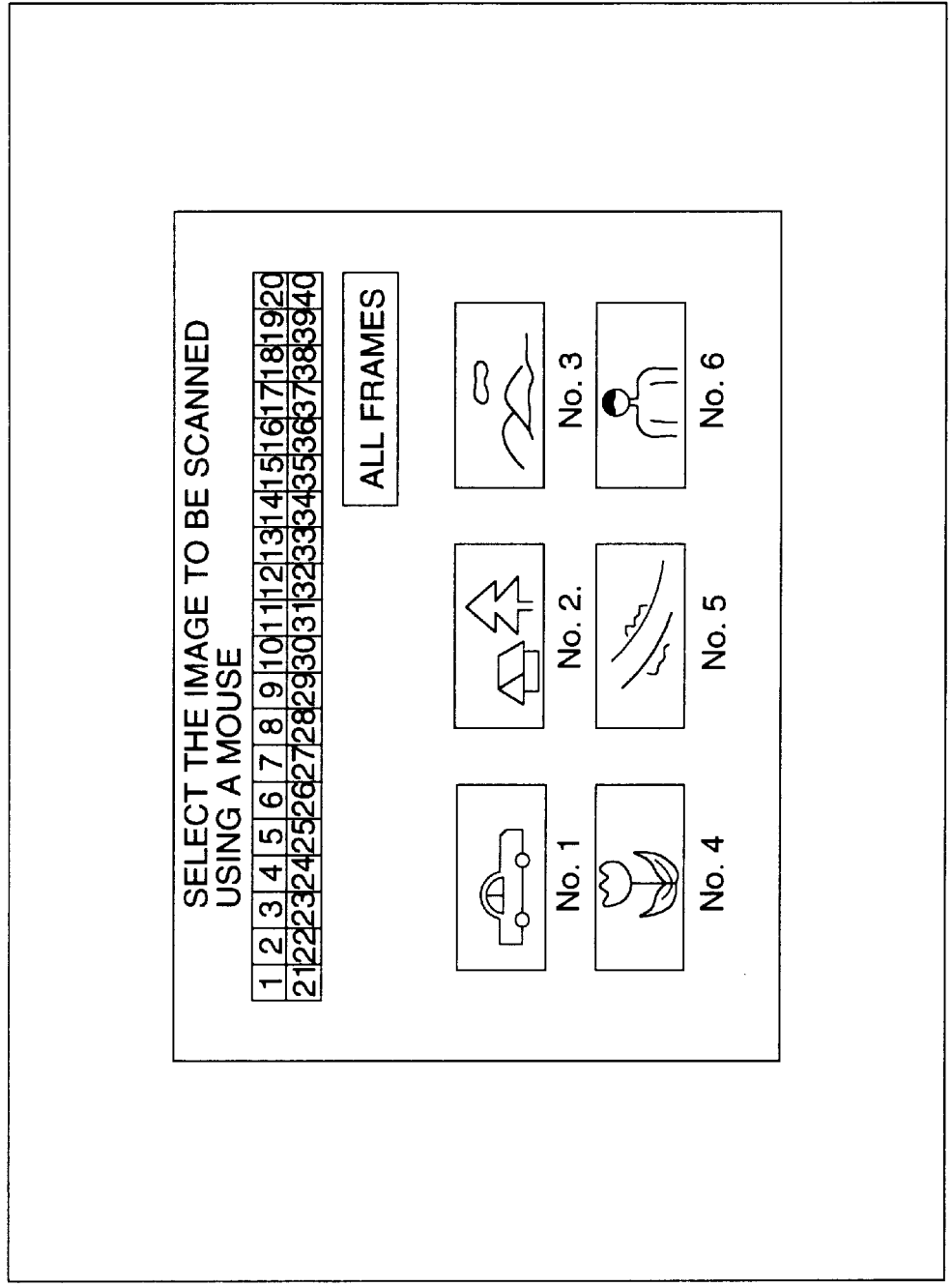
FIG. 22 is a diagram showing an example of display image screen of a CRT.

In step S 15, when N=M+5=1+5=6 is achieved, conditions of step S 15 are satisfied. Therefore, CPU 20 of personal computer section 60 displays 6-frame image data stored in memory 20a on CRT 24 (S 16). Due to this, 6-frame pre-scanning operations are finished. FIG. 22 is a diagram showing an example of an image plane displayed on CRT 24 after completion of pre-scanning. It is understood in the diagram that pre-scanned images of No. 1–No. 6 are displayed. Incidentally, though an occasion of 6-frame pre-scanning is taken in the example described above, it is also possible to conduct pre-scanning for all frames, by clicking "ALL FRAMES" on the display in FIG. 21. Selection among aforesaid cases is at the discretion of an operator. Due to this, an operator can select either pre-scanning for all frames or pre-scanning for the prescribed number of frames only at its own discretion.

Next, let it be considered that an operator sets M=10 in the case of a 25-frame IX-240 film. Though it is checked whether N has become equal to M or not in step S 3, they are not equal each other because of N=1 and M=10. So, CPU 1 sends a command to carrier 3 to instruct film winding (S 4). Then, the CPU 1 checks whether a film end is observed or not (S 5). In the case of a 25-frame IX-240 film, for example, when there is made a mistake such as setting M=30, a film end comes before N=M is materialized. Therefore, D.C. motor 55 of carrier 3 conducts film rewinding (S 8), and a film quantity is notified from the CPU 1 to CPU 20 of personal computer section 60 through data communication section 4. So the CPU 20 modifies 40 frames displayed on CRT 24 to 25 frames to indicate the number of sheets (S 9), and then returns to the first step S 1. Since a screen of the CRT 24 in this case displays the number of film frames of 25, an operator is free from making a mistake in setting forefront frame M for pre-scanning.

Since a film end does not come yet in the example mentioned above, D.C. motor 55 completes film winding for one frame (S 6), and CPU 1 updates N by 1 (S 7). This materializes N=2. Then the CPU 1 returns to step S 3 and checks whether N=M has been materialized or not (S 3). Since N is not yet equal to M, the CPU 1 sends a command to carrier 3 to instruct film winding (S 4). Then, the CPU 1 checks whether a film end comes or not (S 5). Since a film end does not come yet, D.C. motor 55 completes film winding for one frame (S 6), and the CPU 1 updates N by 1 (S 7). This materializes N=3.

After that, the same operation is repeated, and after winding for 9 frames, N=M=10 is materialized in step S 3, then the sequence enters step S 10 where pre-scanning operations for 10 frames up to 15 frames are carried out. As a result, a pre-scanning image identical to that in FIG. 22 is displayed on CRT 24, resulting in a display of frame images for No. 10–No. 15.

A problem is in the case where M=24 is set when a film of 25-frame images is used. If no action is taken in the aforesaid occasion, only two frames of No. 24 and No. 25 are all obtained. Therefore, the following control is conducted. In step S 3, since N is not equal to M because of N=1 and N=24, CPU 1 instructs carrier 3 to start film winding (S 4). Then, the CPU 1 checks whether a film end comes or not (S 5). Since a film end does not come yet in this step, film winding for one frame is completed (S 6), and N is updated by 1 (S 7) to materialize N=2. In step S 3, since N is not equal to M because of n=2 and M=24, film winding is started (S 4), and whether a film end comes or not is checked (S 5). Since a film end does not come yet, film winding for one frame is completed by D.C. motor 55 of scanner 3 (S 6), N is updated (S 7), and the sequence returns to step S 3. When the abovementioned operations are repeated, N=M=24 is materialized under the condition of N=24 (S 3). So, scanner 30 conducts pre-scanning for No. 24 frame (S 10). Next, the CPU 1 instructs CPU 50 of carrier 30 to start film winding (S 11).

Next, the CPU 1 checks whether a film end comes or not (S 12). Since a film end does not come yet in this step, the sequence enters step S 13, and film winding for one frame is completed by carrier 3 (S 13). Then the CPU 1 updates a value of N by 1 (S 14). As a result, N=25 is materialized and the last frame is displayed. The CPU 1 checks whether N=M+5 is materialized or not. Since N is not yet equal to M+5, scanner 30 conducts pre-scanning (S 10) and causes film winding of carrier 3 to be started (S 11). When the CPU 1 checks whether a film end comes or not, on the other hand, a film end is detected from film end perforation 85 (S 12). Then the sequence enters operations of pre-scanning for the necessary number of frames which precede the following established value M.

The CPU 1 carries out initial setting to L=1 (S 16). Then, CPU 3 instructs CPU 50 of carrier 3 to start film rewinding for one frame (S 17) and to complete film rewinding (S 18). Next, the CPU 1 updates L by 1 to materialize L=2 (S 19) and conducts operations to subtract 1 from N (S 20). This newly materializes N=24, because N=25 has been kept in the above-mentioned processing. Then, the CPU 1 checks whether L=6 is materialized or not (S 21). Because of L=2 in the present example, conditions are not satisfied. Therefore, the sequence returns to step S 17 to start film rewinding for one frame (S 17) and to complete film rewinding (S 18). Film rewinding is conducted by D.C. motor that is driven by CPU 50 of carrier 3. Next, L is updated by 1 to become 3 (S 19). Then, CPU 1 conducts operations for subtracting 1 from N (S 20), which materializes N=23.

Next, the CPU 1 checks whether L=6 has been materialized or not (S 21). Since L=3 is still kept, the conditions are not satisfied. So the sequence returns to step S 17 to execute film rewinding. When L=6 is materialized in the course of aforesaid processing, the CPU 1 conducts pre-scanning (S 22). In this case, the number of a film frame is represented by N=20. Image data obtained through the pre-scanning are notified to personal computer section 60 from data communication section 4 of scanner 30, and then are stored in memory section 20a. Then the CPU 1 instructs carrier 3 to start film winding (S 23), and completes film winding (S 24). Then, N is updated by 1 to materialize N=21 (S 25).

Next, the CPU 1 checks whether N is equal to M−1 or not (S 26). Since N=21 and M−1=23 are materialized now, the sequence returns to step S 22 to conduct pre-scanning (S 22). Image data obtained through the pre-scanning are notified to personal section 60 from data communication section 4 of scanner 30, and then are stored in memory 20a. Then, the CPU 1 starts film winding for carrier 3 (S 23) and completes film winding (S 24). Then, N is updated by 1 to materialize N=22 (S 25). Next, whether N is equal to M−1 or not is checked, and N=22 and M−1=23 make the sequence to return to step S 22 to conduct pre-scanning (S 22). Image data obtained through the pre-scanning are notified to personal computer section 60 from data communication section 4 of scanner section 30, and then are stored in memory section 20a. After the pre-scanning is completed, film winding is started (S 23), and film winding is completed (S 24). Then, N is updated by 1 to materialize N=23 (S 25). Then, the CPU 1 compares N with M−1 (S 26). Now, N=23 and M−1=23 are materialized to be the same each other, and 6-frame images read through pre-scanning are displayed on CRT 24 (S 16), and operations are completed. In accordance with the present example, when a film is an IX-240 film, it is possible to achieve easy operation in pre-scanning conducted by a control means for frames in necessary quantity from the forefront frame designated by a forefront frame designating means, and is possible to carry out, by means of pre-scanned images of plural frames, the color correction which is more effective.

Figure 23:
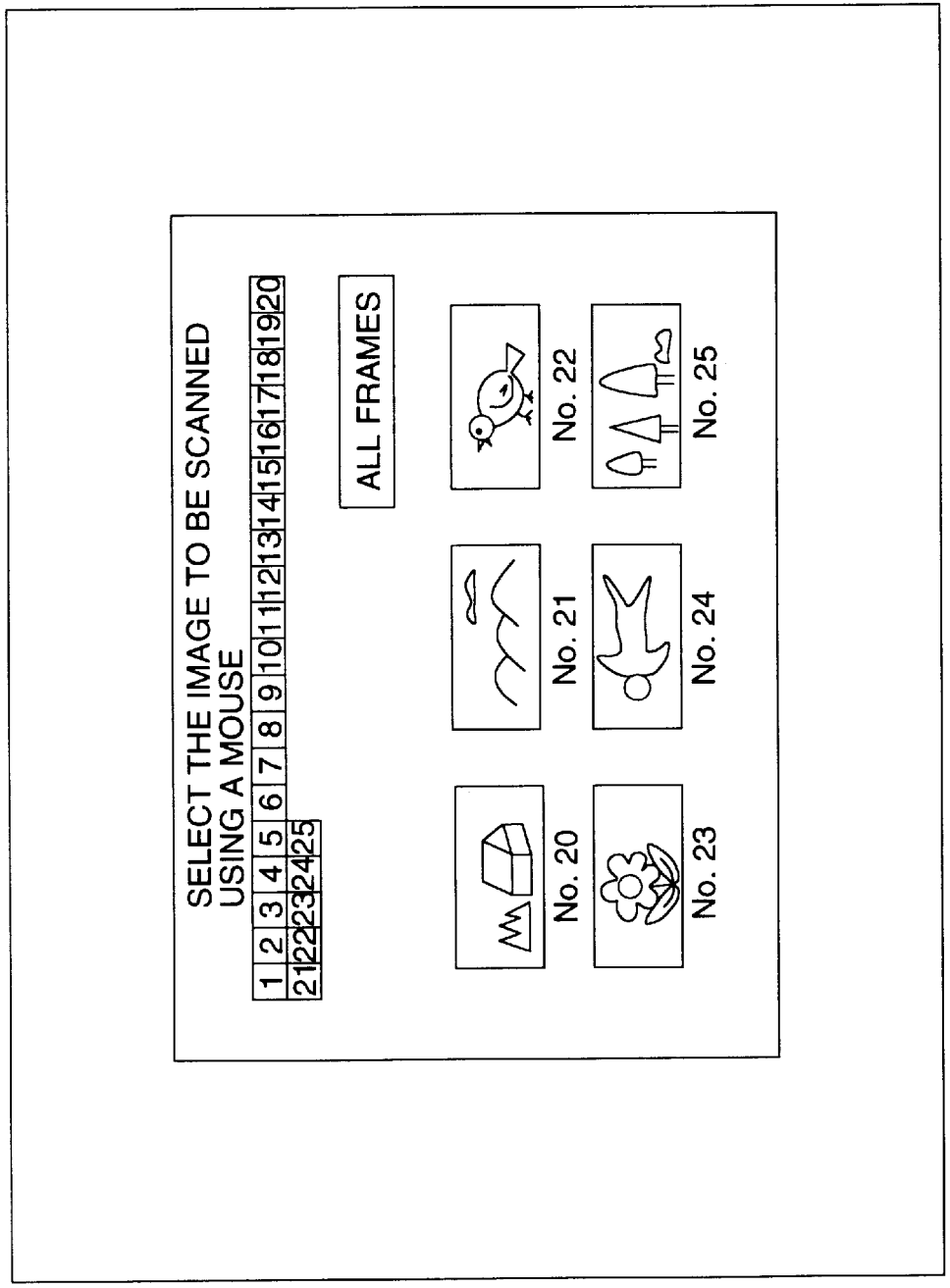
FIG. 23 is a diagram showing an example of display image screen of a CRT.
Figure 24:
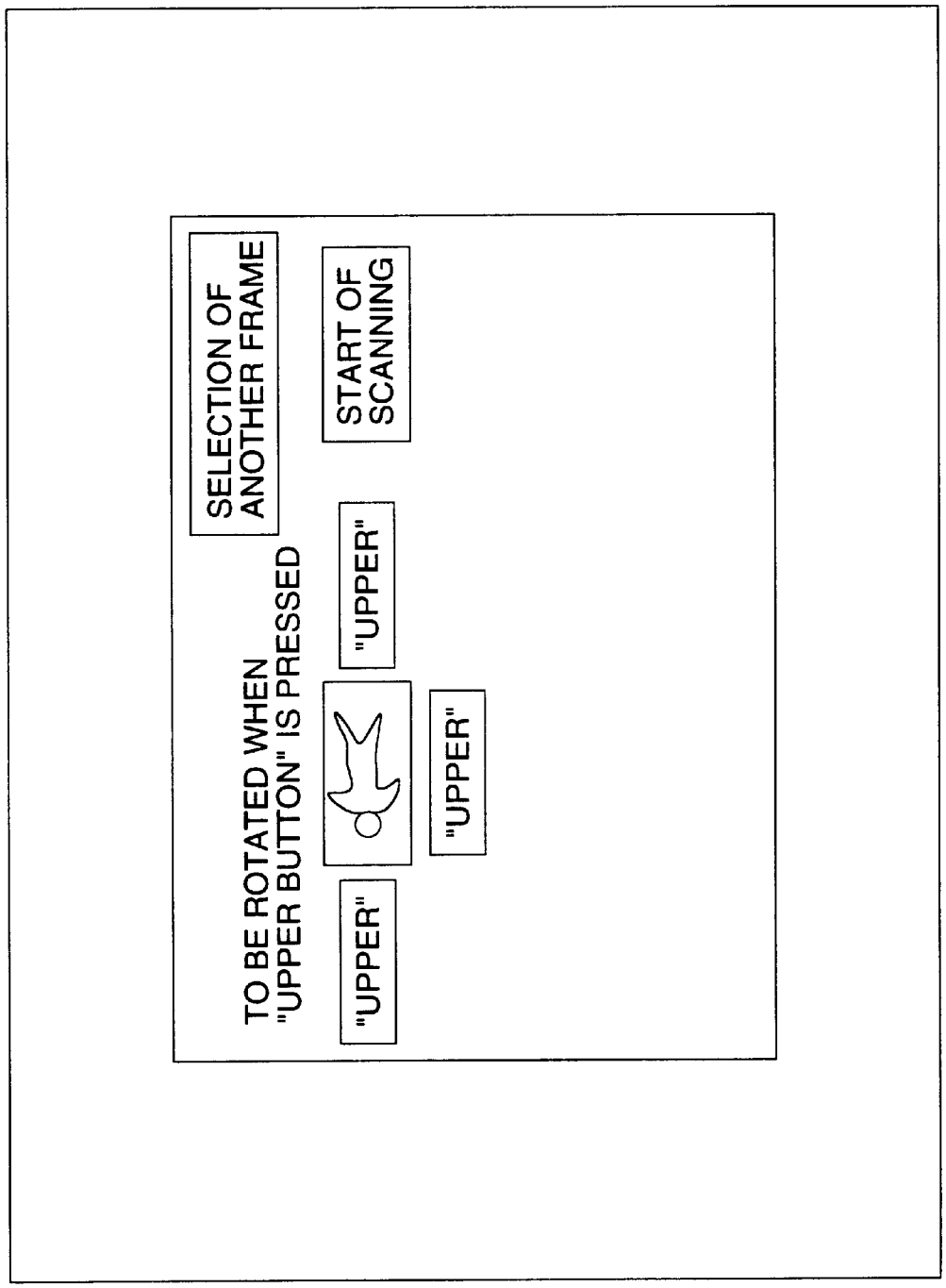
FIG. 24 is a diagram showing an example of display image screen of a CRT.
Figure 25:
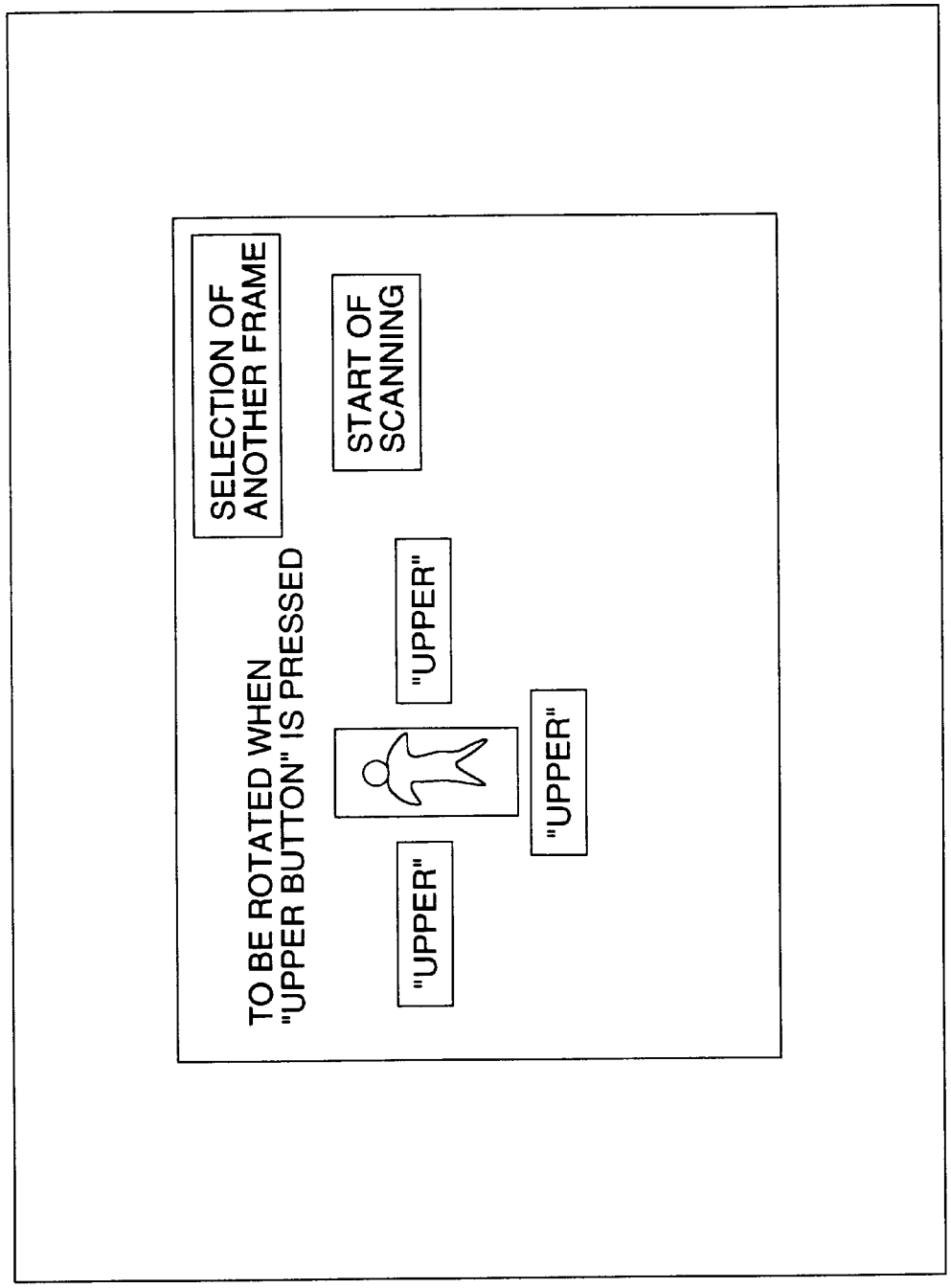
FIG. 25 is a diagram showing an example of display image screen of a CRT.

FIG. 23 shows pre-scanned images obtained in a way described above. There are displayed 6-frame images for No. 20–No. 25 in the drawing. After obtaining 6-frame pre-scanned images, these 6-frame image data are analyzed, and it is possible to obtain the optimum γ characteristics and exposure quantity characteristics (color correction data). By using the characteristics thus obtained for image data processing in regular scanning, it is possible to obtain optimum images. Incidentally, images displayed in the aforesaid manner can be subjected to compilation of instructions. For example, when an image of No. 24 is clicked, a display in FIG. 24 appears. On the side of the image, there is indicated an icon represented by "UPPER". When a necessary "UPPER" is clicked with a mouse, for example, when an "UPPER" on the left side is clicked, image rotation is made so that the clicked "UPPER" comes to the top, thus, the one where the image is rotated as shown in FIG. 25 is displayed. When a "START SCANNING" icon is clicked in this case, for example, this command is sent to scanner section 30 from personal computer section 60 through data communication section 21, and the CPU 1 starts regular scanning for objective frame images.

In the example described above, the number of frames to be pre-scanned is 6 to which the invention is not limited, and frames in any number can be pre-scanned. Further, in the example described above, an occasion wherein scanner section 30 and personal computer section 60 are provided separately is explained as an example, to which the invention is not limited, and it is possible to make the scanner section and the personal computer section to be united solidly.

In addition, in the pre-scanning operations described above, an occasion where an IX-240 film is pre-scanned is explained as an example, to which the pre-scanning of the invention is not limited, and it is possible to apply equally the film structured to be rolled in a cartridge.

Further, in the example described above, an occasion where a CCD for image reading and a CCD for discriminating the type of a film are used in common is explained as an example, to which the invention is not limited, and it is possible to provide a CCD for image reading and a CCD for discriminating the type of a film separately.

Furthermore, color separation data do not also need to be limited to aforesaid R, G and B, and data such as density distribution for each color and a histogram employing the density distribution for each color can also be used.

Next, the second example of the invention will be explained as follows. The basic structure of the present example is the same as that of the example shown in FIGS. 1–5. The present example is represented by a photographic image processing apparatus having therein a film scanner in which an image recorded on a processed film is read by an image reading means, wherein there is provided a control means which reads, with the image reading means, image data on an area other than an image area of the processed film based on prescribed data reading conditions, and discriminates the type of the film based on brightness data of the image data.

From a point of view that the density on an area other than an image area of a film varies depending on the type of the film, the structure of the invention makes it possible to read brightness data as image data and thereby to discriminate the type of a film based on the read brightness data.

The second example is represented by a photographic image processing apparatus having therein a film scanner in which an image recorded on a processed film is read by an image reading means, wherein there is provided a control means which reads, with the image reading means, image data on an unexposed area and an area in the vicinity of the unexposed area of the processed film based on prescribed data reading conditions, and discriminates the type of the film based on brightness data of the image data.

From a point of view that the density on an unexposed area and an area in the vicinity of the unexposed area of a film varies depending on the type of the film, the structure of the second example makes it possible to read brightness data as image data and thereby to discriminate the type of a film based on the read brightness data.

Figure 26:
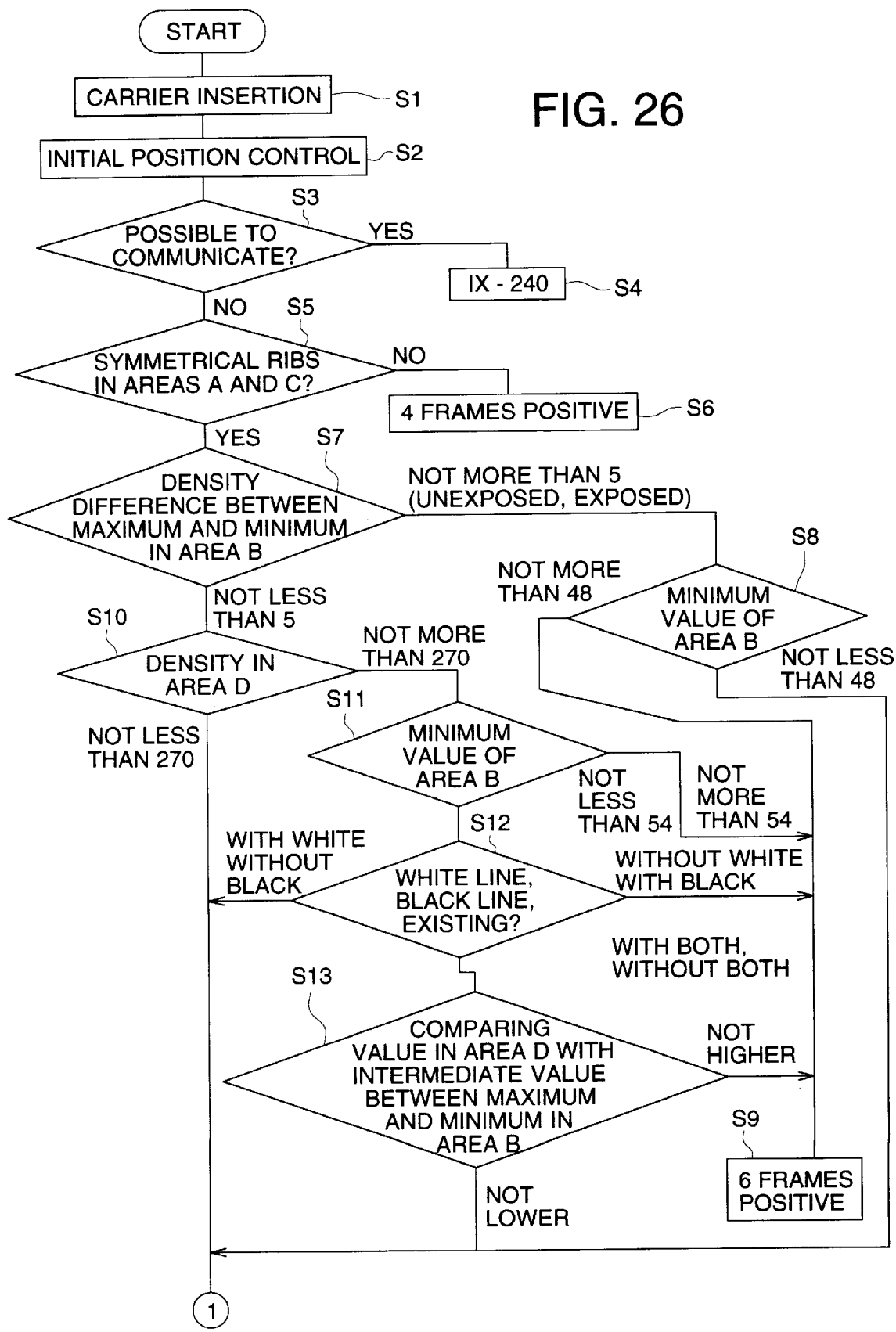
FIG. 26 is a flow chart showing the second example of a film automatic recognition operation of the invention.
Figure 27:
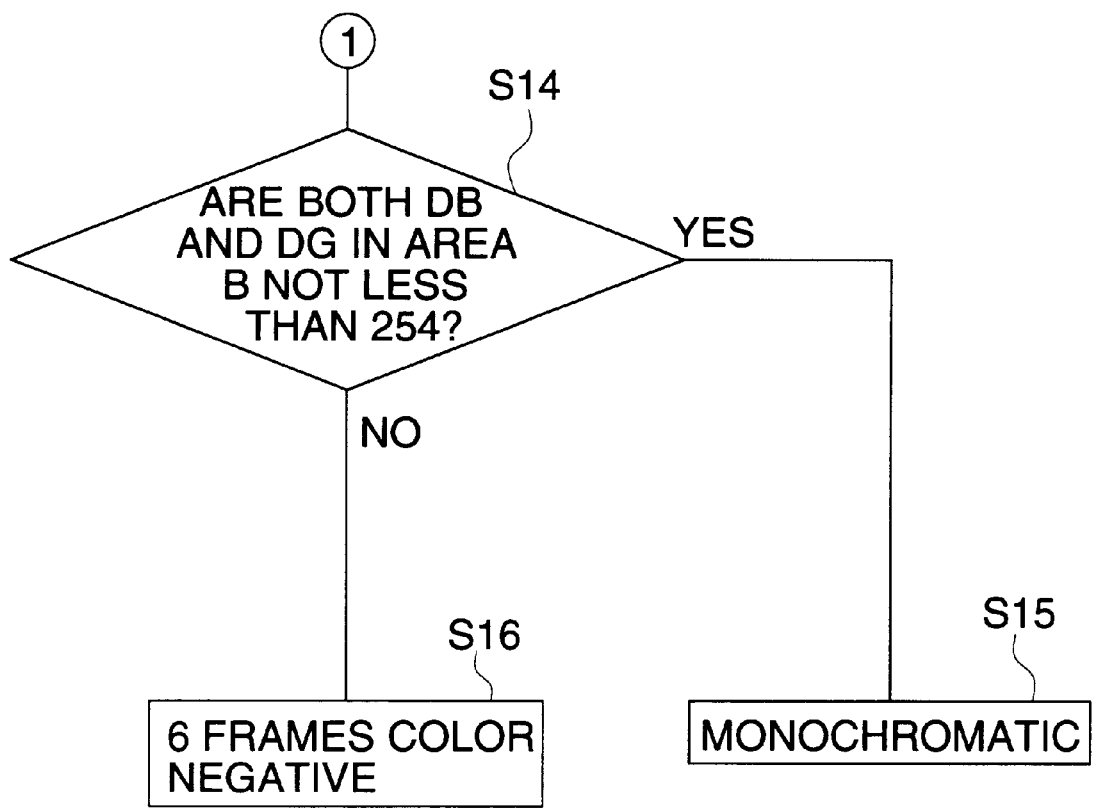
FIG. 27 is a flow chart showing the second example of a film automatic recognition operation of the invention.

Operations in the second example will be explained in detail as follows, using a flow chart. FIG. 26 and FIG. 27 represent a flow chart showing an example of automatic recognition operations for a film in the second example. In the assumption of the operations, the standard reading condition is represented by an occasion where a film is a color negative film. With regard to the condition, data accumulation conditions (power of a lamp, accumulation time of a CCD, gain of an amplifier, etc.) are established so that the output result of color separation may almost be in the vicinity of the maximum value of output data, and each of color separation data may be mostly the same each other. Due to this, it is possible to discriminate the type of a film by comparing the film with image data in the case of a color negative film, using an occasion of a color negative film representing the standard reading condition.

(3) Discrimination of 4-frame positive film

When it is impossible to communicate between a carrier and a film scanner, the carrier inserted is supposed to be either carrier 1 or carrier 2. Therefore, CPU 1 reads image data on an area between frames of a film (an area other than an image area of a film, or an unexposed portion of the film with an area in the vicinity of the unexposed portion). To be concrete, signals obtained through reading by CCD 37 are converted into digital image data by A/D conversion circuit 6, and then are given to CPU 20 of personal computer section 60.

Figure 28:
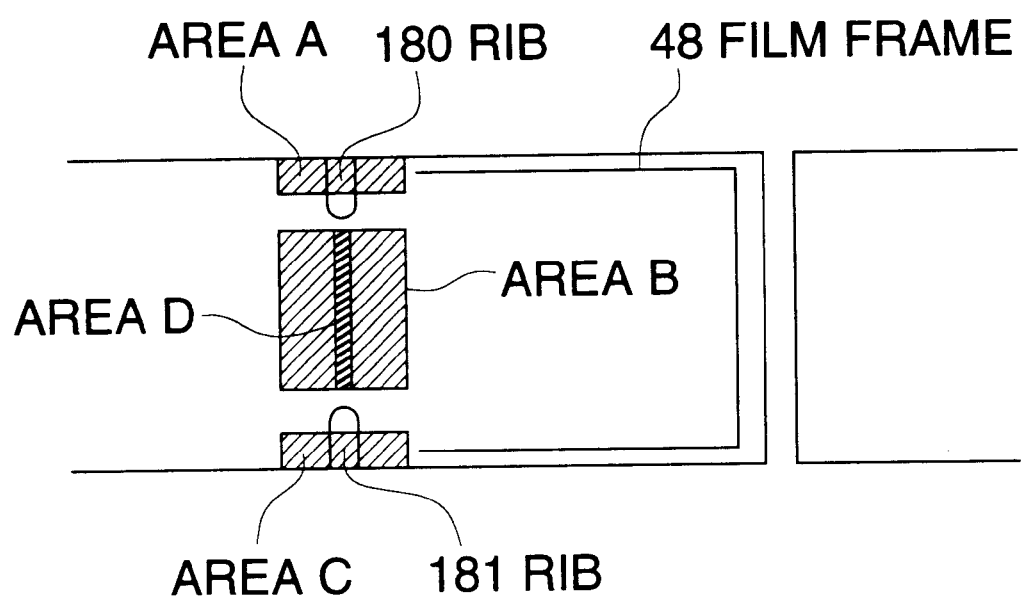
FIG. 28 is an illustration of an area to be read.

FIG. 28 is an illustration for an area to be read. In this case, the area to be read is divided into 4 areas represented by A–D. In the drawing, 48 represents a film frame, while 180 and 181 represent ribs formed symmetrically on carrier 1. Let it be assumed that area A and area C represent respectively an area including an upper rib and that including a lower rib, area B represents an area formed between rib 180 and rib 181, and area D represents a narrow and linear area formed at a central position of a rib judged from the areas A and C. When a film is held by a carrier, the area D is supposed to exist between frames.

Data of these areas read by a scanner are stored in memory 20a in CPU 20 from data communication section 4 through data communication section 21 of personal computer section 60. The CPU 20 checks, based on these read data, whether ribs exist symmetrically about area A and area C (S 5. Operations for detecting a rib will be described later.). In this case, the rib means a projection provided on a boundary between frames. When a specific position is observed under the condition that a carrier is set to its initial position, a rib can be observed on carrier 1 holding a 6-frame film, while no rib can be observed on carrier 2 holding a mounted film (see FIG. 42). FIG. 42 is an illustration for ribs, and ribs 180 and 181 are provided symmetrically in the case of carrier 1, while no rib is provided in the case of carrier 2. Accordingly, when no rib is observed, CPU 20 discriminates the type of a film to be 4-frame positive (S 6).

From a point of view that ribs are symmetrically provided vertically on a boundary between frames when a film carrier is a 6-frame carrier, and no rib is provided in the case of a 4-frame positive film carrier, the second example makes it possible to judge that the type of a film is 4-frame positive when no rib is provided.

(4) Discrimination of 6-frame positive film

In step S 5, when ribs are symmetrically provided, a carrier is supposed to be carrier 1. A film held in the carrier 1 includes a 6-frame positive film, a 6-frame color negative film and a 6-frame monochromatic negative film. The CPU 20 obtains a density difference between the maximum value and the minimum value on area B, and compares this density difference (difference data) with threshold value 5 (S 7). The CPU 20 obtains a difference between the maximum value and the minimum value of brightness data on area B through calculation. In the present example, resolution of color separation data for R, G and B is represented by the bit number of A/D converter for A/D conversion which is 8 bits. The resolution represented by 8 bits is 256 covering a range of 0–255. Let is be assumed that R data, G data and B data are respectively represented by DR, DG and DB. In this case, DR+DG+DB represents brightness data.

From a point of view that the difference data between the maximum value and the minimum value of brightness data on area B obtained varies depending on the type of a film, the second example makes it possible to discriminate the type of film by judging whether the difference value is greater or smaller than a prescribed threshold value.

When the difference data are smaller than 5, it means that there is hardly a density difference on a film. Such a phenomenon can take place when the aforesaid area is unexposed, or over-exposed. In this case, the CPU 20 obtains the minimum value of brightness data on area B, and compares the obtained minimum value with threshold value 48 (S 8). When the minimum value of brightness data is not more than 48, the CPU judges that the type of a film is 6-frame positive (S 9). Since a positive film is characterized in that a boundary between frames is extremely dim, it is possible to discriminate a 6-frame positive film.

From a point of view that difference data of brightness data on area B are smaller than threshold value 5 and the minimum value of brightness data on area B is smaller than threshold value 48 when the type of a film is 6-frame positive, the second example makes it possible to discriminate a 6-frame positive film.

In step S 7, when difference data on area B are greater than 5, the CPU 20 obtains density (brightness data) on area D, and compares it with threshold value 270 (S 10). When brightness data on area D are smaller than 270, a 6-frame positive film is discriminated through algorithm shown below, because there is a possibility that a 6-frame positive film is included.

The CPU 20 obtains the minimum value of brightness data on area B, and compares it with threshold value 54 (S 11). When the minimum value of brightness data is lower than threshold value 54, it means that a boundary between frames is dim. Therefore, the type of a film is judged to be 6-frame positive (S 9).

In the second example, when the difference data are greater than threshold value 5, brightness data on area D is compared with prescribed threshold value 270, and when the brightness data are smaller than the threshold value 270, the minimum value of brightness data on area B is further obtained, and when this minimum value is smaller than threshold value 54, the type of a film is judged to be 6-frame positive.

Next, when the minimum value of brightness data on area B is greater than threshold value 54 in step S 11, the CPU 20 checks, in accordance with a prescribed algorithm, whether a white line and a black line exist or not from the whole of area B (S 12). Now, there will be explained a reason why it is necessary to check by defining a white line and a black line. Even when the minimum value of brightness data on area B is not less than threshold value 54, there are also some cases where density (brightness) of area B exceeds 54 despite a positive film, in the case of an overexposure. Therefore, a concept of a white line and a black line is used for discrimination of the type of a film for the purpose of discriminating surely that the type of a film is 6-frame positive, even in the aforesaid occasion.

Now, a white line and a black line will be explained. FIGS. 29(a)–29(c) represent an illustration of a white line and a black line. As shown in FIG. 29(a), area B is first scanned in the direction y (longitudinal direction of a film) at prescribed intervals. It is assumed that a scanning interval in the direction x in this case is x1–xn. As a result, brightness data for each scanning is obtained as shown in FIG. 29(b). In FIG. 29(b), the axis of ordinate represents brightness, while the axis of abscissa represents a distance in the direction y.

When mean values are calculated by normalizing all brightness data of x1–xn thus obtained to 0–100%, characteristics shown in FIG. 29(c) are obtained. The axis of ordinate in FIG. 29(c) represents a value which is obtained by normalizing brightness, and the axis of abscissa represents a distance in the direction y. From the characteristics shown in FIG. 29(c), when the minimum value of mean values of xi (i=1–n) is not more than 10 and a length in the direction y is within 20% of the total length when the minimum value agrees with the position of a rib within a certain error range, a black line is discriminated. To the contrary, from the characteristics shown in FIG. 29(c), when the maximum value is not less than 90 when the maximum value agrees with the position of a rib within a certain error range, a white line is discriminated (detailed operations will be described later).

In the manner mentioned above, a white line and a black line are discriminated, and when only a black line exists, the type of a film is judged to be 6-frame positive (S 9).

According to the present example, when it is judged from the whole of area B that black lines only exist, it means that brightness data are dark, and the type of a film is discriminated to be 6-frame positive.

Figure 30:
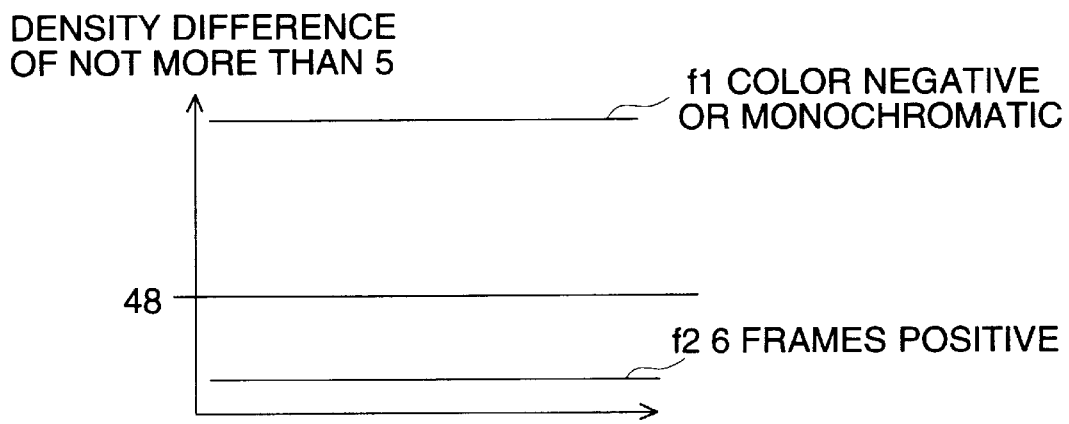
FIGS. 30(a) and 30(b) represent an illustration for discrimination of film types in the invention.
Figure 30:
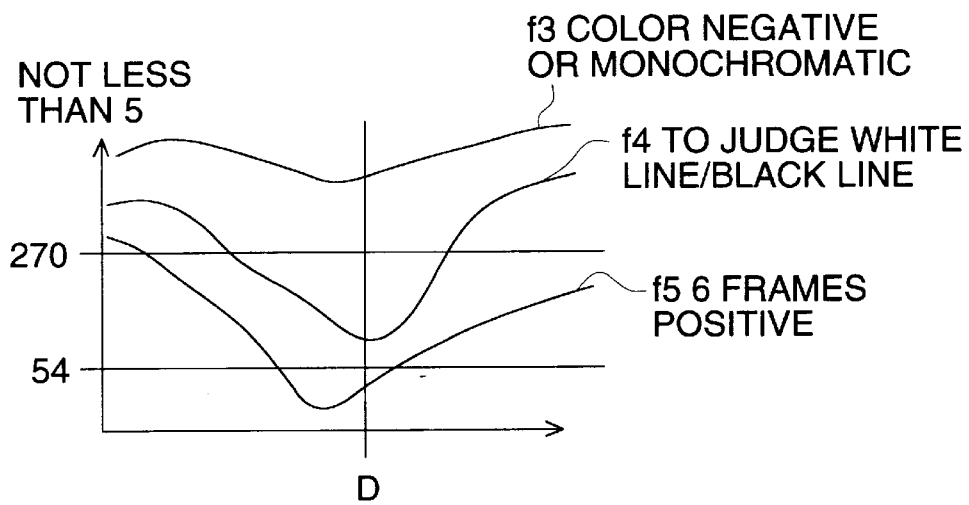

FIG. 30 is an illustration for judgment of a film type in the invention described above. FIG. 30(a) shows an occasion where the difference value (density difference) is not more 5, and FIG. 30(b) shows an occasion where the difference value is not less than 5. The axis of ordinate represents brightness data and the axis of abscissa represents a distance. In FIG. 30(a), when difference data are not more than 5, it is judged whether the minimum value of area B is greater than or smaller than threshold value 48. In the case of characteristics of f1 that is greater than threshold value 48, a film is supposed to be a color negative film or a monochromatic film, and in the case of characteristics of f2 that is smaller than threshold value 48, a film is supposed to be a 6-frame positive film.

In FIG. 30(b), when the difference data are greater than 5, brightness data on area D are compared first with threshold value 270. In the case of characteristic f3 greater than 270, a film is supposed to be a color negative film or a monochromatic film. On the other hand, when brightness data on area D is smaller than 270 and in the case of f4 characteristics where the minimum value of area B is greater than threshold value 54, the type of a film is judged through judgment of a white line and a black line. In this case, when the minimum value of brightness data on area B is smaller than threshold value 54, a film is judged to be a 6-frame positive film because of dimness between frames.

Figure 31:
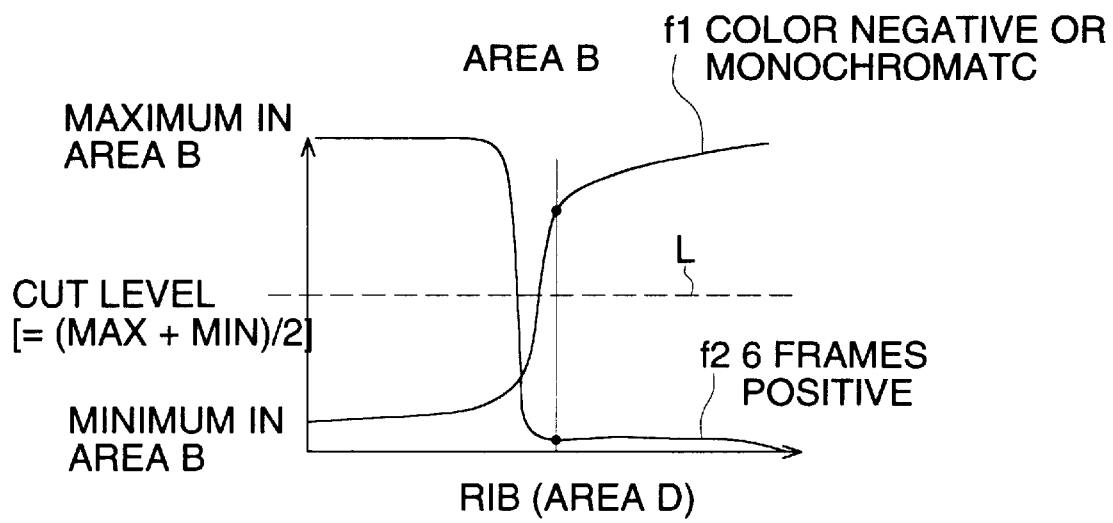
FIGS. 31(a) and 31(b) represent an illustration of a cut level.
Figure 31:
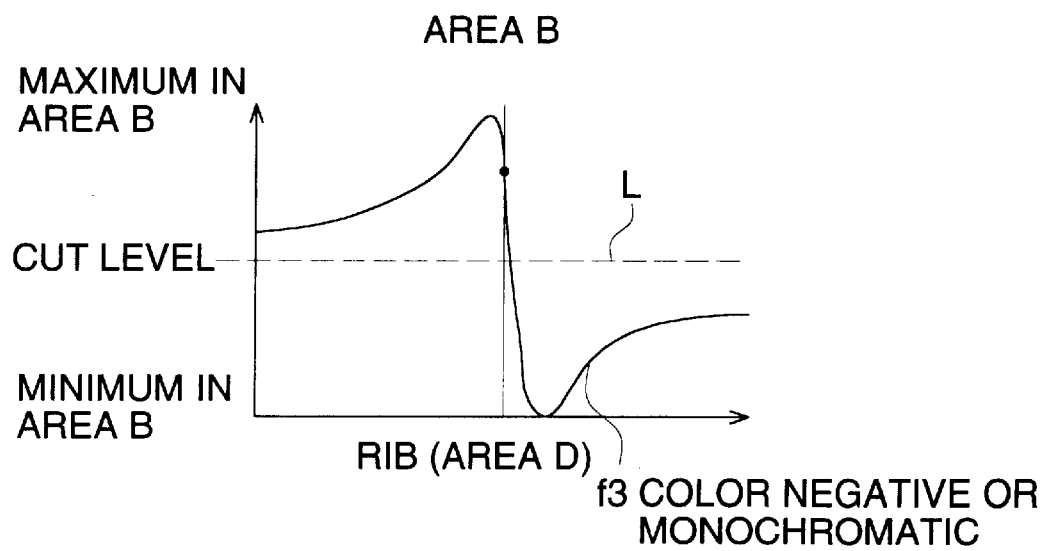

In step S 12, when both a white line and a black line exist, or when neither a white line nor a black line exists, CUP 20 compares brightness data on area D with an intermediate value (cut level) between the maximum value and the minimum value of brightness data on area B (S 13). FIG. 31 is an illustration of a cut level. FIG. 31(a) shows characteristics of brightness data judged from the whole of area B. The axis of ordinate represents brightness data and the axis of abscissa represents a distance. An intermediate value between the maximum value and the minimum value of brightness data of area B is made to be a cut level (shown with L in the drawing), and this cut level is compared with brightness data of area D. In the case of a 6-frame positive film, characteristics shown with f2 in FIG. 31(a) are indicated, and brightness data of area D are smaller than the cut level. In this case, therefore, the CPU 20 judges that the type of a film is 6-frame positive (S 9). In the case of a color negative film or a monochromatic film, characteristics are those shown with fl in FIG. 31(a) which are opposite to those of a 6-frame positive film. Namely, brightness data of area D are greater than the cut level. Incidentally, some films show characteristics f3 as shown in FIG. 31(b). A film having such characteristics is a color negative film or a monochromatic film.

In the second example, when both a white line and a black line exist, or when neither a white line nor a black line exists on area B, brightness data of area D is compared with a cut level, and when brightness data in the fourth area are smaller than the cut level, the type of a film can be judged to be 6-frame positive.

(5) Discrimination of a 6-frame color negative film and a monochromatic film

When the minimum value of area B is not less than 48 in step S 8, or when density of area D is not less than 270 in step S 10, or when only white lines exist in step S 12, or when a value of area D is greater than a cut level in step S 13, a film is supposed to be a 6-frame color negative film or a monochromatic film in terms of type.

Then, the CPU 20 checks whether or not both color separation data DB and DG of area B are 254 or more (S 14). Color separation data in this case mean R, G and B data, and DR represents data of R, DG represents data of G and DB represents data of B. When both color separation data DB and DG are greater than 254, the CPU 20 discriminates the type of a film to be monochromatic (S 15). On the other hand, when both color separation data DB and DG are not greater than 254 (in the case of DB>254, DG<254 or DB<254, DG>254 or DB<254, DG<254), the type of a film is judged to be 6-frame color negative (S 16). This is based on a tendency that density on a boundary between frames is lower for a monochromatic film than for a 6-frame color negative film.

According to the second example, it is possible to judge that the type of a film is monochromatic when both B data represented by DB and G data represented by DG in color separation data in the second area are greater than threshold value 254 when the type of a film is none of IX-240, 4-frame positive and 6-frame positive in the automatic film recognition step up to that moment, and it is possible to judge that the type of a film is 6-frame color negative when conditions that both B data represented by DB and G data represented by DG are greater than threshold value 254 are not satisfied.

(6) Judging operations of a rib

Figure 32:
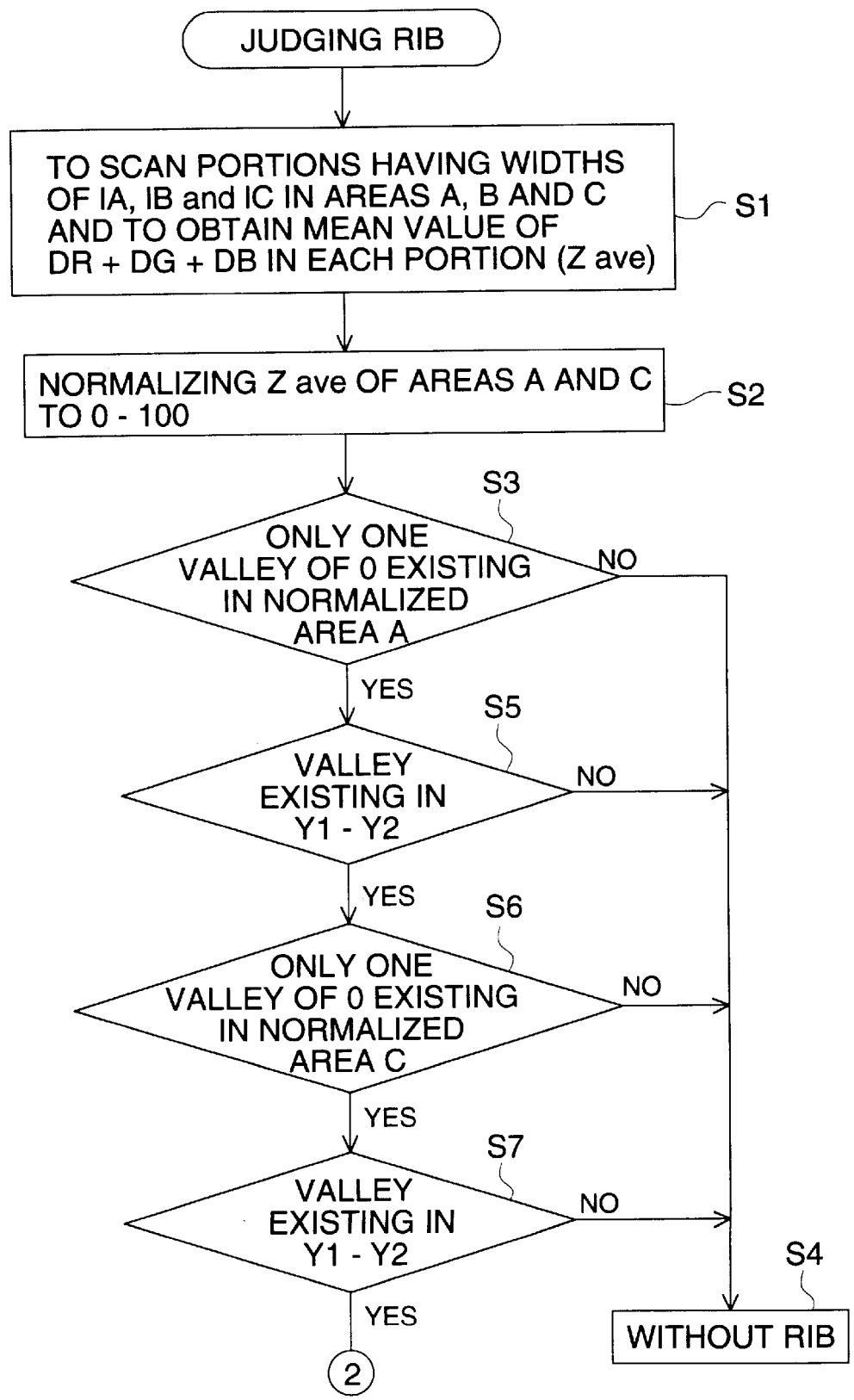
FIG. 32 is a flow chart showing the second example of rib judgment operation.
Figure 33:
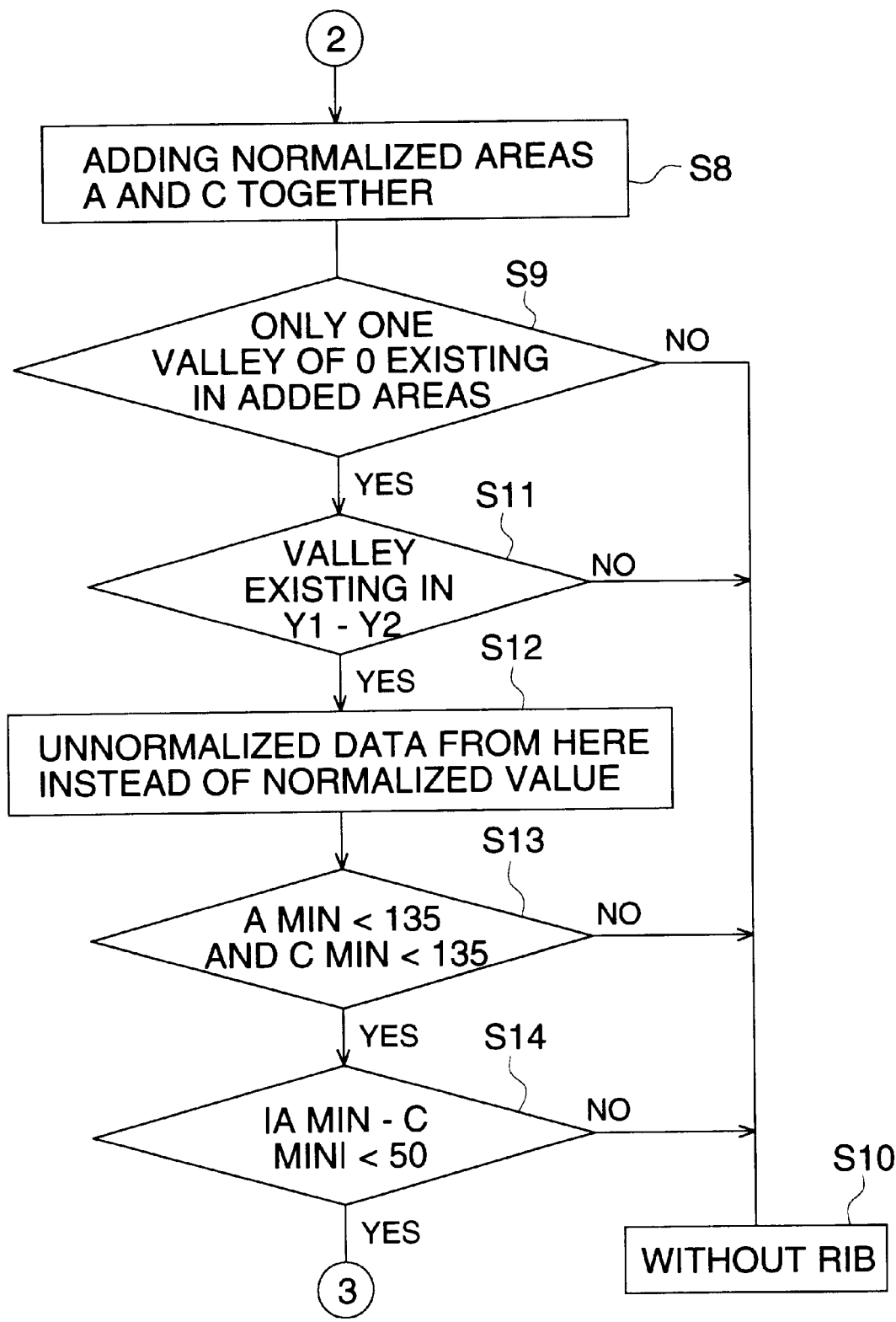
FIG. 33 is a flow chart showing the second example of rib judgment operation.
Figure 34:
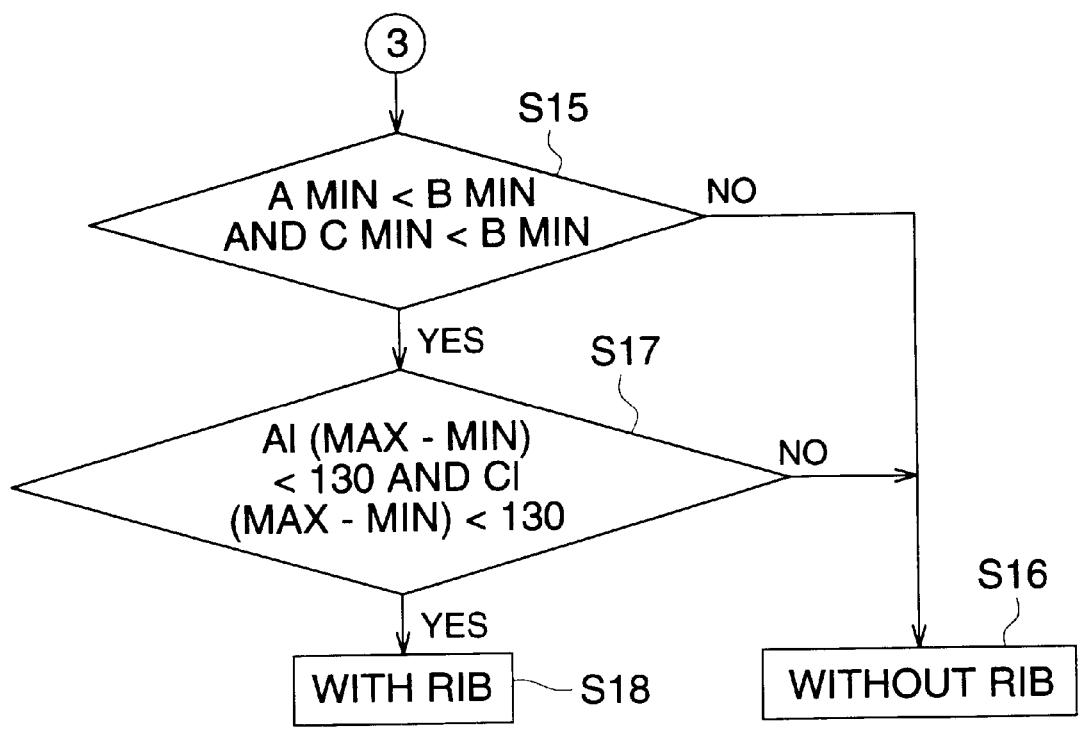
FIG. 34 is a flow chart showing the second example of rib judgment operation.
Figure 35:
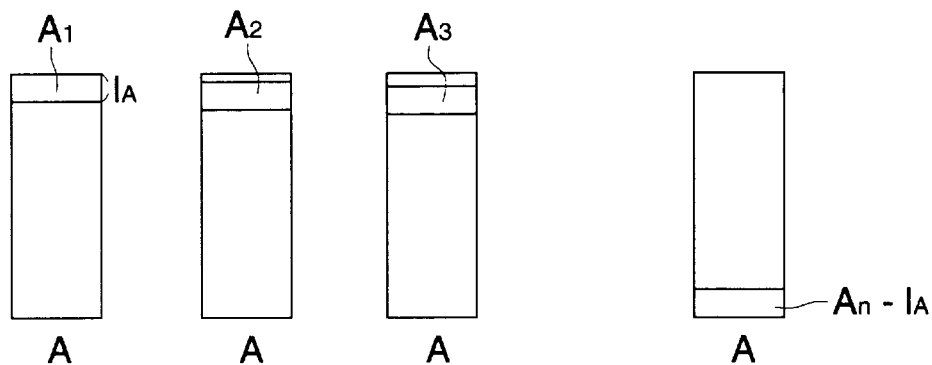
FIGS. 35(a)–35(c) represent an illustration for rib judgment.
Figure 35:
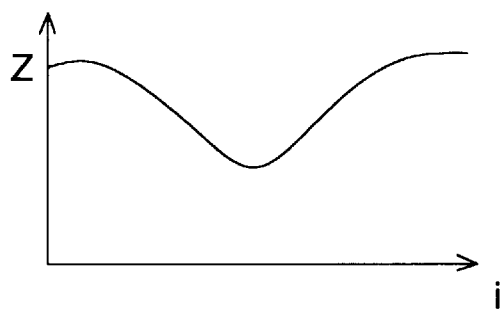
Figure 35:
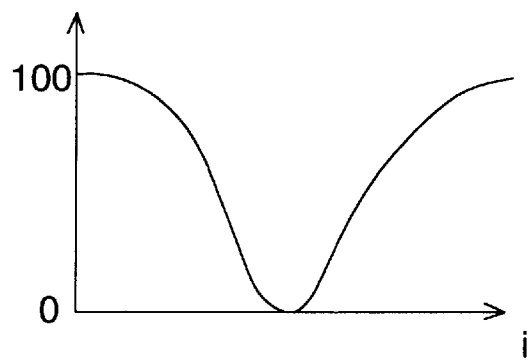

Next, judging operations of a rib shown in FIG. 26 (step S 5) will be explained in detail as follows. FIGS. 32–34 represent a flow chart showing an example of judging operations of a rib, and FIGS. 35(*a*)–37(*c*) represent an illustration for judgment by means of a rib. Scanner 30 scans all of areas A, B and C, and CPU 20 stores data obtained through scanning and reading in memory 20*a*. Then, from memory 20*a*, areas A, B and C are read and calculated in succession by each area having respectively certain width of 1A, IB and 1C, and average value Z ave of DR+DC+DB (brightness data) is obtained in the area (S 1). FIG. 35(*a*) shows how area A is scanned with certain width 1A. FIG. 35(*b*) shows average value Z ave of DR+DG+DB in area Ai. The axis of ordinate represents an average value of brightness data (DR+DC+DB), and the axis of abscissa represents a distance in area A. For areas B and C, the same method can be used for obtaining the average value and others.

Then, the CPU 20 normalizes average value Z ave of areas A and C to 0–100 (S 2). FIG. 35(*c*) shows a normalized average value. Then, the CPU 20 checks, from characteristics shown in FIG. 35(*c*), whether only one valley showing 0 exists in area A or not (S 3). When no valley showing 0 exists, the CPU 20 judges that no rib exists (S 4).

In the normalized area A, when only one valley showing 0 exists, the CPU 20 checks whether the valley exists in prescribed area of y1–y2 in i direction or not (S 5). This operation is based on that the rib exists in each of area A and area C and the rib is positioned mostly at the center of each of area A and area C, as is apparent from FIG. 28. When the valley does not exist in a prescribed range of y1–y2, the CPU 20 judges that no rib exists (S 4).

When the valley exists in area A, the CPU 20 checks whether only one valley showing 0 exists in area C or not (S 6), and when no valley exists, the CPU 20 judges that no rib exists (S 4), while when the valley exists, while when the valley exists, the CPU 20 checks whether the valley exists in prescribed range of y1–y2 (S 7). When no valley exists in area y1–y2, the CPU 20 judges that no rib exists (S 4), while when the valley exists in area y1–y2, the sequence advances to the next step.

Figure 36:
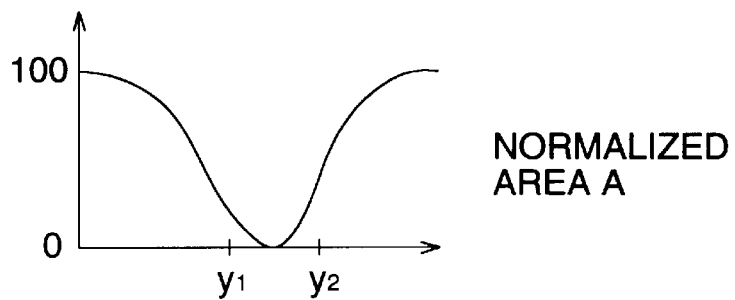
FIGS. 36(a)–36(c) represent an illustration for rib judgment.
Figure 36:
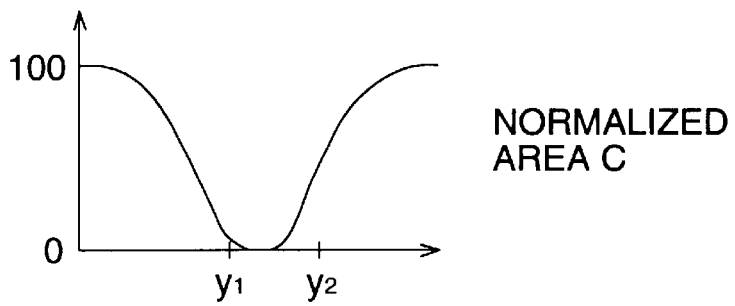
Figure 36:
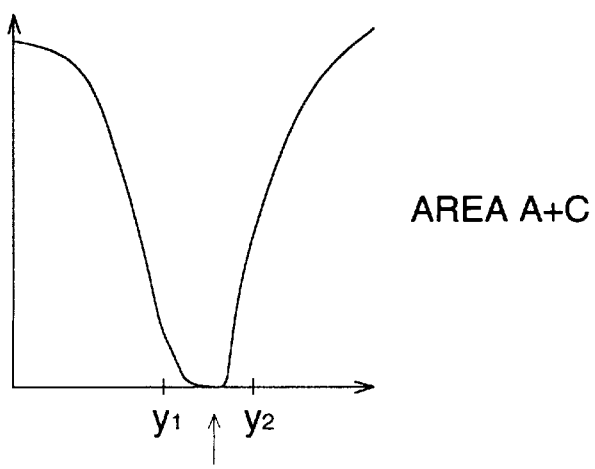

When the valley exists in both areas A and C, the CPU 20 adds normalized areas A and C together (S 8). FIGS. 36(*a*) 36 (*c*) show how area A and area C are added together. FIG. 36 (*a*) shows characteristics of area A, FIG. 36(*b*) shows characteristics of area C, and FIG. 36(*c*) shows characteristics of both areas added up. Then, the area added up is checked whether only one valley showing 0 exists therein or not (S 9). As a result, when no valley showing 0 exists, or when two or more valleys exist, the CPU 20 judges that no rib exists (S 10).

When only one valley exists, the CPU 20 checks whether the valley exists in prescribed area of y1–y2 in i direction or not (S 11). When no valley exists in area y1–y2, the CPU 20 judges that no rib exists (S 10). When the valley exists in area y1–y2, the CPU 20 conducts prescribed processing not for the normalized value but for the data which have not been normalized (S 12).

The CPU 20 obtains the minimum value A min of area A and the minimum value C min of area C for data of area A and area C which have not been normalized shown in FIG. 35(*b*), and checks whether the condition of A min<135 and C min<135 is satisfied or not (S 13). When the condition of A min<135 and C min<135 is not satisfied, the CPU 20 judges that no rib exists because no dim area is supposed to exist in both areas (S 10).

Brightness data in areas A–C are those shown in FIG. 37(*a*) wherein the axis of ordinate represents brightness, and the axis of abscissa represents a distance. When a rib exists, the minimum value is lower than 135 at about the central portion in each of areas A and C as shown in the drawing. Namely, when the condition of A min<135 and C min<135 is satisfied as shown in FIG. 37(*b*) as a condition of existence of a rib, the position of the rib is sufficiently dim.

In step S 13, when the condition of A min<135 and C min<135 is satisfied, the CPU 20 checks whether the condition of |A min−C min|<50 which shows that density of the rib is the same at both sides is satisfied or not (S 14. see FIG. 37(*b*)). When |A min−C min|>50 is shown, the CPU 20 judges that no rib exists (S 10), because density in area A is supposed to be different from that in area C.

In the case of |A min−C min|<50, the CPU 20 checks whether the condition of A min<B min and C min<B min is satisfied or not (S 15). This condition is based on the fact that the position of a rib is more black than a film. When the condition of A min<B min and C min<B min is not satisfied, the CPU 20 judges that no rib exists (S 16). When the condition of A min<B min and C min<B min is satisfied, the CPU 20 checks whether the condition (see FIG. 37(*c*)) of Ai (max−min)<130 and Ci (max−min)<130 which shows that density is uniform in the position of a rib is satisfied or not (S 17). When this condition is not satisfied, the CPU 20 judges that no rib exists (S 16) and when this condition is satisfied, the CPU 20 judges that a rib exists (S 18). In the method mentioned above, it is possible to judge whether ribs exist symmetrically or not.

(7) White line/black line judgment operations

Figure 29:
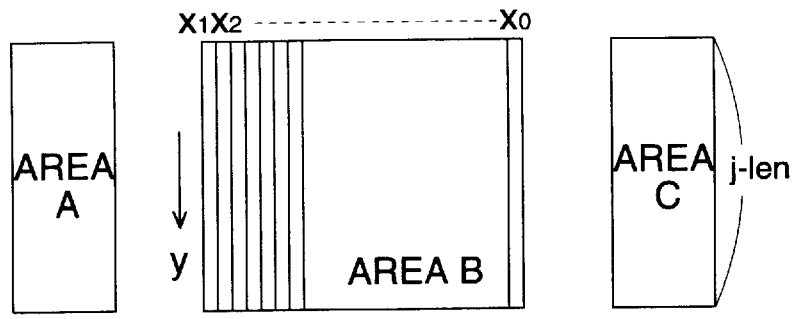
FIGS. 29(a)–29(c) represent an illustration of white lines and black lines.
Figure 29:
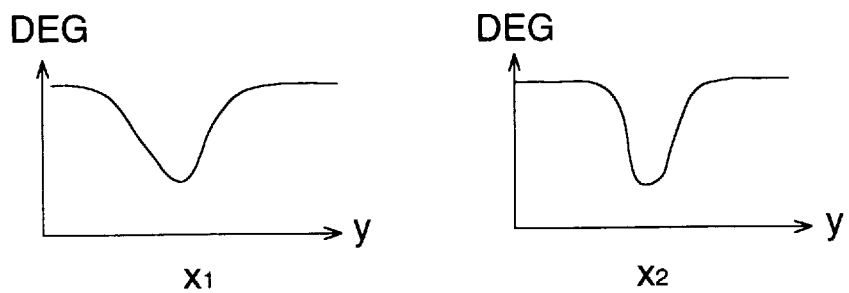
Figure 29:
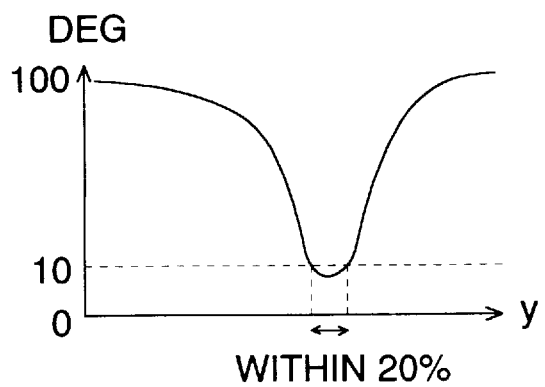
Figure 38:
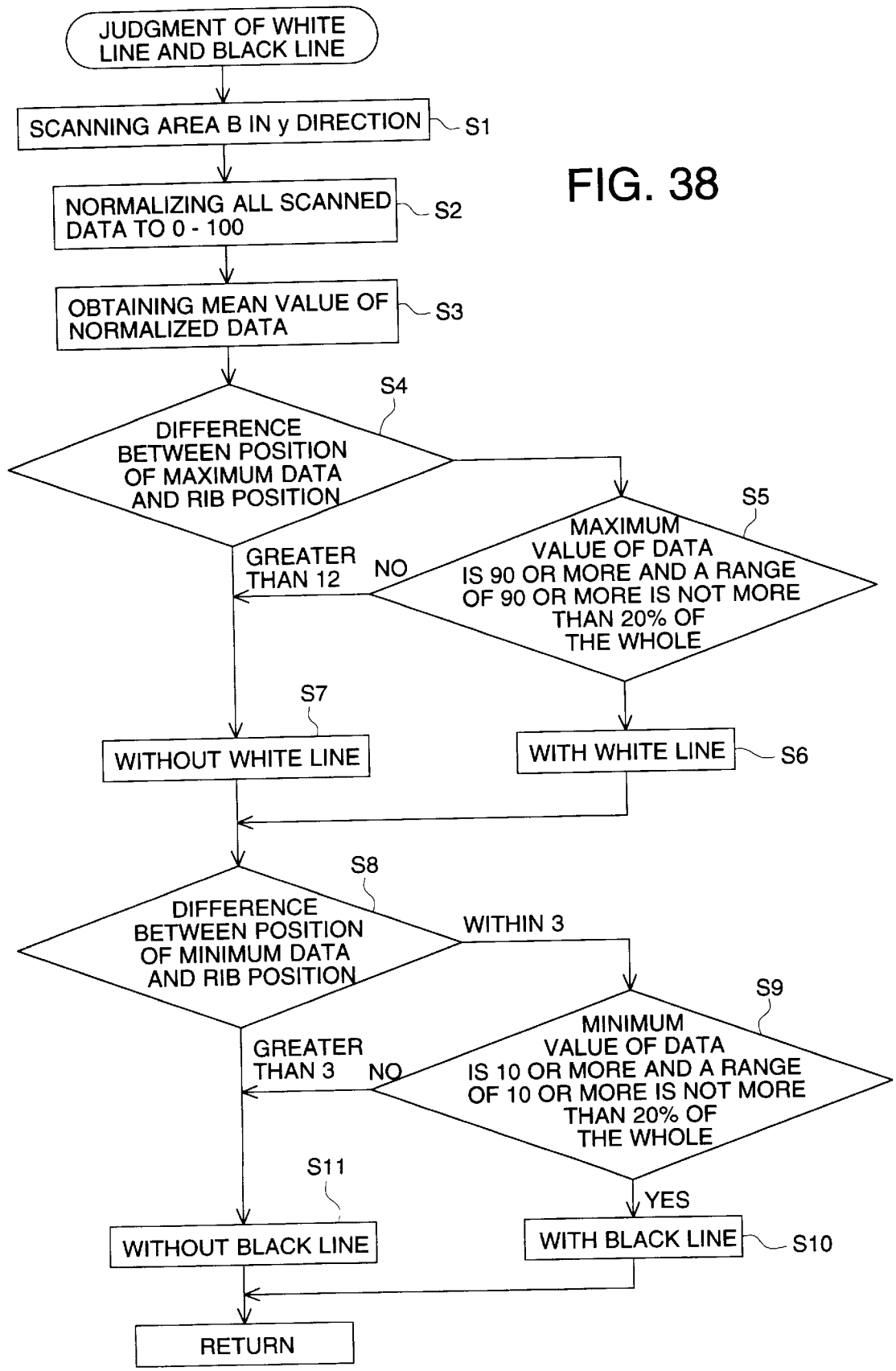
FIG. 38 is a flow chart showing the second example of white line/black line judgment operation.

Next, judgment operations of a white line and a black line mentioned above will be explained. FIG. 38 is a flow chart showing an example of white line/black line judgment operations. FIG. 29 mentioned above will be used for the explanation.

The CPU 20 scans area B in the direction of y (longitudinal direction of a film) at prescribed intervals, as shown in FIG. 29(a) (S 1). Scanning is performed for x1–xn. Results of the scanning result in those shown in FIG. 29(b). Then, the CPU 20 normalizes all of the scanned data to 0–100 (S 2). After normalizing, the CPU 20 calculates an average value of the scanned data (S 3). FIG. 29(c) is a diagram showing an average value of the normalized data. The axis of ordinate represents a distance in the direction of y.

Based on characteristics of the average value, the CPU 20 obtains a difference (error) of data between the position where data become maximum and the position of the rib (S 4). When the difference is within 12, the CPU 20 checks whether or not the maximum value of the data is not less than 90 and the range of not less than 90 is not more than 20% of the total (S 5). When this condition is satisfied, the CPU 20 judges that a white line exists (S 6). When the difference is greater than 12 in step S4, or when the above-mentioned condition is not satisfied in step S 5, the CPU judges that a white line does not exist (S 7).

Next, the CPU 20 obtains a difference (error) of data between the position where the data are minimum and the position of the rib, based on the above-mentioned mean value characteristics (S 8). When the difference is within 3, the CPU 20 checks whether the minimum value of data is not more than 10 and a range of not more than 10 is not more than 20% of the total or not (S 9). When this condition is satisfied, the CPU 20 judges that a black line exists (S 10). When the error is greater than 3 in step S 8, or when the above-mentioned condition is not satisfied in step S 9, the CPU 20 judges that a black line does not exist (S 11). FIG. 29(c) shows characteristics in the occasion where a black line exists. This judgment results in 4 types of judgment results including that only a white line exists, that only a black line exists, that both a white line and a black line exist, and that neither a white line nor a black line exists. In the method mentioned above, it is possible to judge whether a white line and a black line exist or not.

Figure 39:
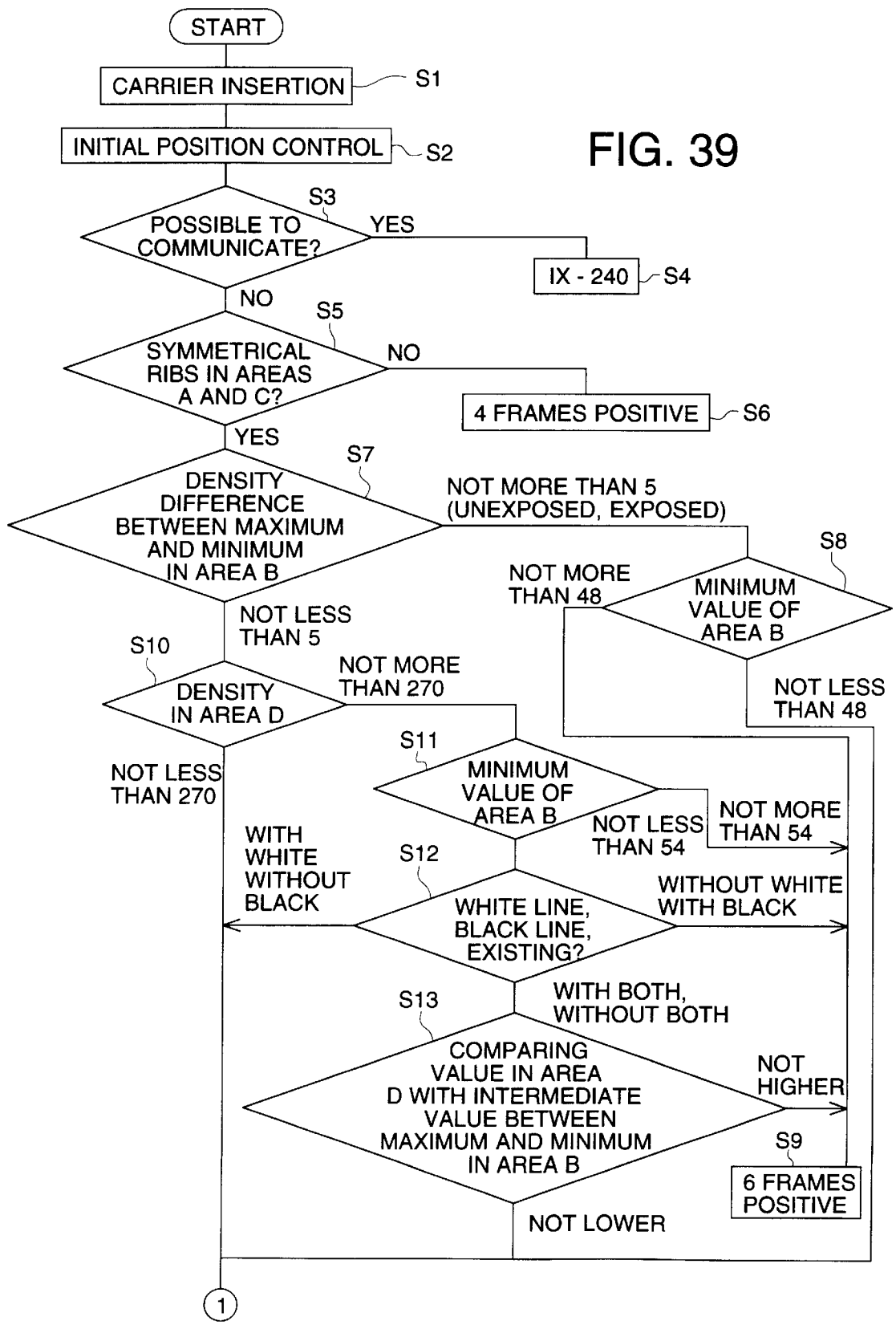
FIG. 39 is a flow chart showing another example of a film automatic recognition operation in the second example.
Figure 40:
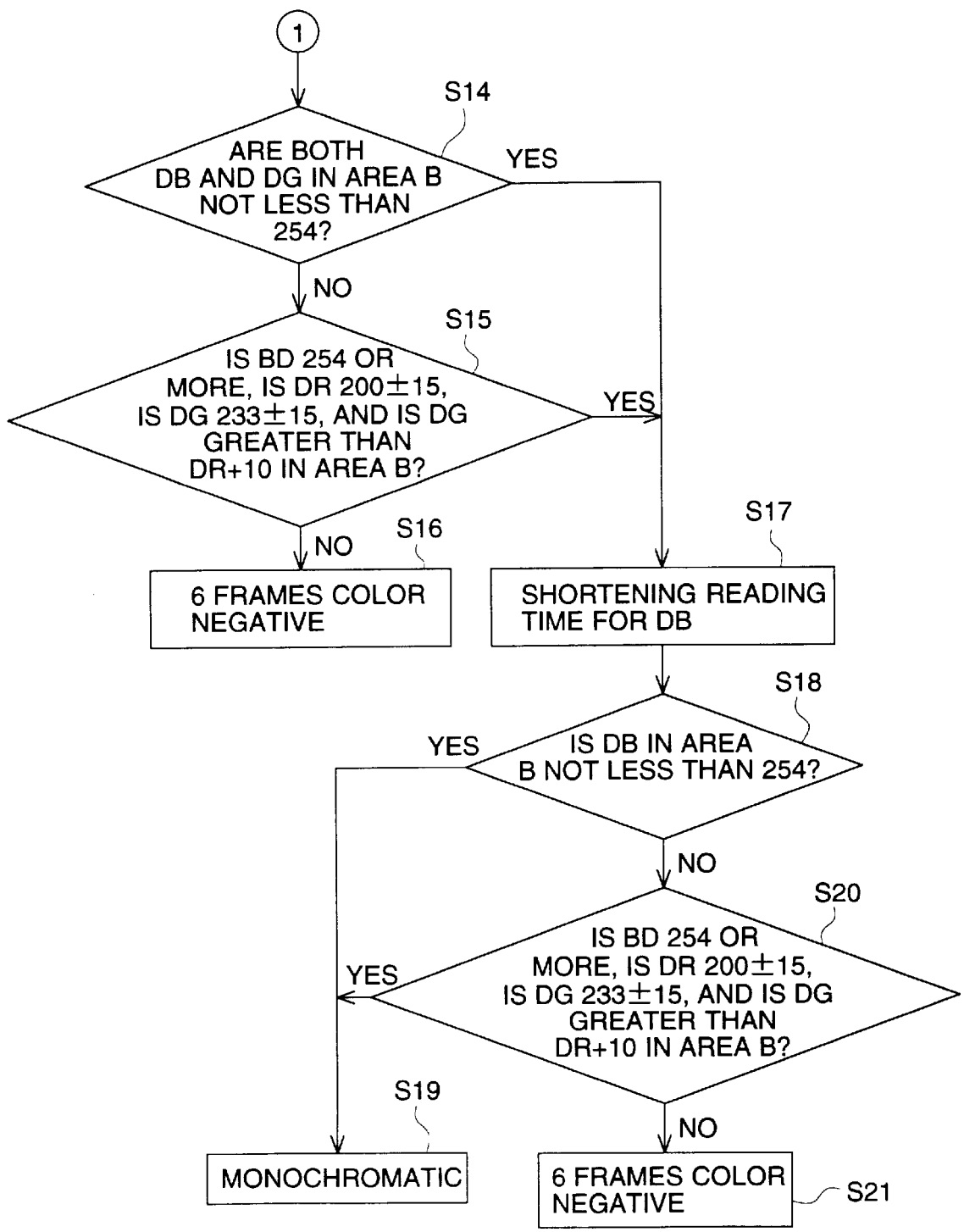
FIG. 40 is a flow chart showing another example of a film automatic recognition operation in the second example.

FIGS. 39 and 40 represent a flow chart showing another example of film automatic recognition operations. In this example, it is possible to discriminate a specific 6-frame color negative film contained extremely rarely in those judged through operations shown in FIGS. 26 and 27 to be monochromatic. Since this specific 6-frame color negative film is similar to a monochromatic film in terms of characteristics of density on a boundary between frames, the specific 6-frame color negative film is one which is made to be capable of being discriminated between a 6-frame color negative film and a monochromatic film through a prescribed algorithm. Since the sequence of steps S 1–S 13 shown in FIG. 38 is the same as that in FIG. 26, the explanation thereof will be omitted.

In film discrimination operations, when the film falls on none of an IX-240 film, a 4-frame positive film and a 6-frame positive film, the CPU 20 checks whether both DB representing data B on area B and DG representing data are not less than 254 or not (S 14). When neither DB nor DG is not less than 254, the CPU 20 checks whether or not DB of area B is 254 or more, DR is 200±15, DG is 233±15, and a condition of DG>DR+10 is satisfied (S 15). As a result, when prescribed plural conditions in step S 15 are not satisfied, the CPU 20 judges that a film is a 6-frame color negative film (S 16).

In the present example, when the condition that both DB representing data B of area B and DG representing data G are greater than the fifth threshold value is not satisfied, color separation data for the second area are checked whether they satisfy the condition of prescribed plural threshold values or not. When they do not satisfy the condition, the film is discriminated to be a 6-frame color negative film in terms of its type.

When both data DB of area B and DG are not less than 254 in step S 14, or when color separation data of the second area satisfy the condition of prescribed plural threshold values in step S 15, the CPU 20 shortens the reading time for DB representing data B for re-scanning (S 17). The purpose of operations of shortening the reading time for re-scanning is to check whether it is possible to return the saturated data DB to the linear area or not.

FIGS. 41(a) and 41(b) represent a diagram showing an example of data characteristics obtained by re-scanning after shortening the reading time for DB. In the case of a monochromatic film, DB is constantly at 255 under the 8-bit condition as shown in FIG. 41(a). Namely, DB is saturated. This means that CCD is highly charged electrically. On the other hand, even in the case of a specific 6-frame color negative film, DB is constantly at 255.

Figure 41:
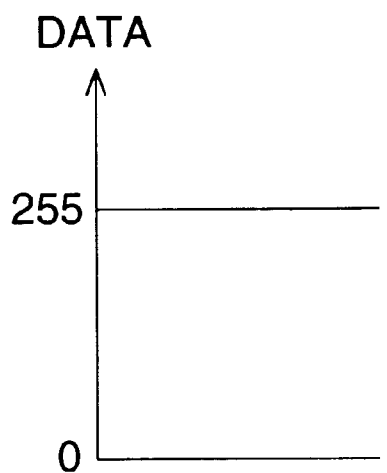
FIGS. 41(a) and 41(b) represent a diagram showing data characteristics in re-scanning with shortened reading time for DB.
Figure 41:
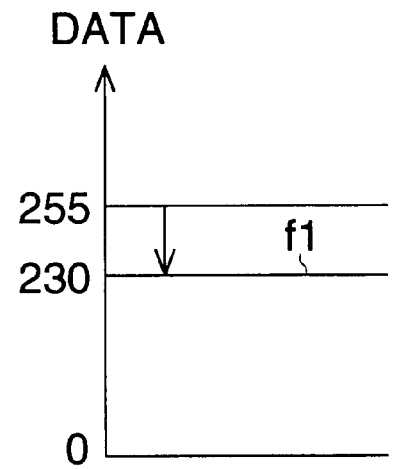

When the reading time for DB is shortened for re-scanning under aforesaid condition, CCD is less charged accordingly. As a result, in the case of a specific 6-frame color negative film, charges of CCD are not saturated, and DB is lowered to a linear area as shown with fl in FIG. 41(b). In the drawing, an example where DB is lowered to 230 is shown. In the case of a monochromatic film, on the other hand, brightness is extremely intense. Therefore, even when the scanning time is shortened, CCD is still charged highly to be saturated in terms of electrical charges as shown in FIG. 41 (a). In the following steps, discrimination between a monochromatic film and a specific 6-frame color negative film is carried out, utilizing the characteristics mentioned above.

In the present example, when the type of a film is discriminated to be monochromatic in an automatic film type recognition step up to that moment, even a specific 6-frame color negative film which is included in results of judgment of a monochromatic film and exists extremely exceptionally, having a boundary between frames that is brighter than that on an ordinary 6-frame color negative film can also be discriminated, as stated above. Therefore, it is possible to obtain color separation brightness data in an area where CCD output is linear, by shortening the reading time for data B, and thereby to discriminate the type of a film based on the color separation brightness data thus obtained.

CPU 20 checks whether data DB of area B after re-scanning is not less than 254 or not (S 18). When DB is 254 or more, it means that saturation still exists, which makes the CPU 20 to discriminate the type of a film to be monochromatic (S 19).

In the present example, when data B of area B obtained through re-scanning is greater than the sixth threshold value, the type of a film can be discriminated to be monochromatic.

When DB of area B is not more than 254, the CPU 20 checks whether the conditions that data DB of area B is not less than 254, data DR is 200±15, data DG is 233±15, and DG is greater than DR+10 are satisfied or not (S 20). When these conditions are satisfied, the CPU 20 discriminates a film to be a monochromatic film (S 19), while these conditions are not satisfied, the CPU 20 discriminates a film to be a specific 6-frame color negative film (S 21).

In the present example, when a film is a specific 6-frame color negative film, color separation data obtained through re-scanning with the shortened reading time are divided into those which enter a linear area from a saturation area of CCD and those which do not enter. Therefore, it is possible to discriminate between a specific 6-frame color negative film and a monochromatic film, by checking whether the condition of prescribed plural threshold values is satisfied or not.

In the present example, there has been explained an example employing 8-bit as resolution of image data. However, the second example is not limited to this, and any bit number can be used when necessary.

As stated above, the present invention makes it possible to provide a photographic image processing apparatus capable of reading the type of a film automatically from the film carrier inserted.

What is claimed is:

1. A photographic image processing apparatus, comprising:
    a carrier receiving section for receiving at least one of:
        (a) a first film carrier having an accommodation section, for accommodating a cartridge in which a rolled film is enclosed, and a conveying mechanism, for conveying said rolled film; and
        (b) a second film carrier for holding a film;
    a scanning means for reading image information from at least one of said rolled film, accommodated in said cartridge, and said film, held by said second film carrier;
    a detecting means for detecting a load of at least one of said first film carrier and said second film carrier to said carrier receiving section;
    a contact point for electrically connecting said carrier receiving section and said first film carrier; and
    a discrimination means for discriminating between said first film carrier and said second film carrier by sending electric signals through said contact point when said detecting means detects said load of at least one of said first film carrier and said second film carrier.

2. The photographic image processing apparatus of claim 1, further comprising:
    a carrier driving means for moving at least one of said first film carrier and said second film carrier to a predetermined position.

3. The photographic image processing apparatus of claim 1, wherein said cartridge of said rolled film is IX-240 type; and further comprising:
    a display means for displaying a maximum frame number of said rolled film when said discrimination means discriminates said first film carrier from said second film carrier;
    a forefront frame setting means for setting a forefront frame of said rolled film; and
    a control means for controlling said scanning means so that said scanning means starts scanning said rolled film from said forefront frame, set by said forefront frame setting means, for a predetermined number of frames as pre-scanning.

4. The photographic image processing apparatus of claim 3, wherein said control means starts scanning said rolled film from a frame closest to said forefront frame for said predetermined number of frames as pre-scanning when said predetermined number of frames do not exist from said forefront frame in said rolled film.

5. The photographic image processing apparatus of claim 4, further comprising:
    a selection means for selecting a pre-scanning mode from a first mode that said pre-scanning is conducted from said forefront frame, set by said forefront frame setting means, for said predetermined number of frames and a second mode that said pre-scanning is conducted for scanning all frames of said rolled film.

6. The photographic image processing apparatus of claim 1, wherein said second film carrier includes a first type for holding a piece film and a second type for holding a mounted film.

7. A photographic image processing apparatus, comprising:
    a carrier receiving section for receiving at least one of:
        (a) a first film carrier for holding a mounted film; and
        (b) a second film carrier for holding a piece film;
    a scanning means for reading image information from at least one of said mounted film, held by said first film carrier, and said piece film, held by said second film carrier;
    a detecting means for detecting a load of at least one of said first film carrier and said second film carrier to said carrier receiving section;
    a discrimination means for discriminating between said first film carrier and said second film carrier according to image data of said image information corresponding to a first predetermined region of at least one of said mounted film and said piece film when said detecting means detects said load of at least one of said first film carrier and said second film carrier.

8. The photographic image processing apparatus of claim 7, wherein said image data is color separation brightness data.

9. The photographic image processing apparatus of claim 7, wherein said image data includes data corresponding to a partition portion of said second film carrier, provided between frames of said second film carrier, when said discrimination means judges that said second film carrier is received by said carrier receiving section.

10. The photographic image processing apparatus of claim 8, wherein said color separation brightness data is color separation brightness data of three primary colors in Red, Green, and Blue.

11. The photographic image processing apparatus of claim 8,
    wherein said discrimination means controls said scanning means so that said scanning means reads said image information from said first predetermined region at a predetermined pitch in a longitudinal direction of said mounted film or said piece film;
    said discrimination means calculates sums of said color separation brightness data at every pitch of said predetermined pitch for covering said first predetermined region; and
    said discrimination means discriminates said first film carrier from said second film carrier when the minimum value of said sums exceeds a first threshold value.

12. The photographic image processing apparatus of claim 7, further comprising:
    a control means for adding a color correction for a color positive film to said image information when said discrimination means judges that said first film carrier is received by said carrier receiving section.

13. The photographic image processing apparatus of claim 9,
    wherein said second film carrier includes a pair of cutout ribs in said partition portion;
    said discrimination means controls said scanning means so that said scanning means reads said image information from a second predetermined region between said pair of cutout ribs at a predetermined pitch in a longitudinal direction of said piece film;

said discrimination means calculates sums of said color separation brightness data at every pitch of said predetermined pitch for covering said second predetermined region; and said discrimination means discriminates a color positive piece film from said piece film when the minimum value of said sums is less than a second threshold value.

14. The photographic image processing apparatus of claim 13, wherein said discrimination means discriminates a color negative piece film and black and white negative piece film from said piece film when the minimum value of said sums is not less than said second threshold value.

15. The photographic image processing apparatus of claim 13, further comprising:

a control means for adding a color correction for a color positive film to said image information when said discrimination means discriminates said color positive piece film from said piece film.

16. The photographic image processing apparatus of claim 14, wherein said discrimination means determines said color separation brightness data in three primary colors at every pitch of said predetermined pitch for covering said second predetermined region; and said discrimination means discriminates said black and white negative piece film from said color negative piece film when the maximum value of said color separation brightness data in two of said three primary colors is equal to a third threshold value and the maximum value of said color separation brightness data in other one of said three primary colors is between a fourth threshold value and a fifth threshold value.

17. The photographic image processing apparatus of claim 16, wherein said discrimination means discriminates said color negative piece film from said black and white negative piece film when the maximum value of said color separation brightness data in two of said three primary colors is not equal to a third threshold value or the maximum value of said color separation brightness data in other one of said three primary colors is not between a fourth threshold value and a fifth threshold value.

18. The photographic image processing apparatus of claim 17, further comprising:

a control means for adding a color correction for a color negative film to said image information when said discrimination means discriminates said color negative piece film from said black and white negative piece film.

19. A photographic image processing apparatus, comprising:

a carrier receiving section for receiving a film carrier for holding a film; and a scanning means for reading image information from said film, held by said film carrier;

a detecting means for detecting a load of said film carrier to said carrier receiving section;

a determination means for determining a type of said film according to image data, of said image information, corresponding to a predetermined region, which includes an unexposed area of said film and an area in the vicinity of said unexposed area, when said detecting means detects said load of said film carrier.

20. The photographic image processing apparatus of claim 19, wherein said predetermined region is divided to four regions; and said determination means determines said type of said film as a type of four-frame positive film when image data, representing ribs, does not exist symmetrically in a first region and a third region of said four regions.

21. The photographic image processing apparatus of claim 20, wherein said determination means said type of said film by calculating a difference data between the minimum value and the maximum value of brightness data on a second region of said four regions and comparing a value of said difference data with a first threshold value when image data, representing said ribs, exists symmetrically in said first region and said third region.

22. The photographic image processing apparatus of claim 21, wherein said determination means determines said type of said film as a type of six-frame positive film when said value of said difference data is less than said first threshold value and the minimum value of brightness data on said second region is less than a second threshold value.

23. The photographic image processing apparatus of claim 21, wherein said determination means determines said type of said film as a type of six-frame positive film when said value of said difference data is more than said first threshold value, a value of brightness data on a fourth region of said four regions is less than a third threshold value, and the minimum value of brightness data on said second region is less than a fourth threshold value.

24. The photographic image processing apparatus of claim 23, wherein said determination means classifies said brightness data on said second region, in a scanning direction of said scanning means, into white lines and black lines; and said determination means determines said type of said film as said type of six-frame positive film when the minimum value of brightness data on said second region is less than said fourth threshold value and said second region includes only said black lines.

25. The photographic image processing apparatus of claim 24, wherein said determination means determines said type of said film as said type of six-frame positive film when said second region includes both of said white lines and said black lines or non of said white lines and said black lines, and said value of brightness data on said fourth region is less than an intermediate value between the minimum value and the maximum value of brightness data on said second region.

26. The photographic image processing apparatus of claim 25, wherein said determination means determines said type of said film as a type of monochrome film when values of color separation data corresponding to Blue and Green of said brightness data on said second region are both more than a fifth threshold value, and said determination means determines said type of said film as a type of six-frame color negative film when said values of said color separation data corresponding to Blue and Green of said brightness data on said second region are both less than said fifth threshold value under one of conditions:

(a) when said value of said difference data is less than said first threshold value and the minimum value of brightness data on said second region is more than a second threshold value;

(b) when said value of brightness data on said fourth region of said four regions is more than said third threshold value;

(c) when said second region includes only said white lines; and (d) when said value of brightness data on said fourth region is more than said intermediate value between the minimum value and the maximum value of brightness data on said second region.

27. The photographic image processing apparatus of claim 26, wherein said determination means determines said type of said film as said type of six-frame color negative film when values of said color separation data of said brightness data on said second region are outside a plurality of predetermined ranges.

28. The photographic image processing apparatus of claim 26, wherein said determination means controls said scanning means so as to re-read said image information corresponding said color separation data in Blue of said brightness data on said second region at shorter reading time than a normal reading time when said values of said color separation data corresponding to Blue and Green of said brightness data on si said second region are more than said fifth threshold value, or when said values of said color separation data corresponding to Blue and Green of said brightness data on said second region are not more than said fifth threshold value and values of said color separation data of said brightness data on said second region are within a plurality of predetermined ranges.

29. The photographic image processing apparatus of claim 28, wherein said determination means determines said type of said film as said type of monochrome film when value of said color separation data in Blue of said brightness data on said second region at re-reading is more than a sixth threshold value.

30. The photographic image processing apparatus of claim 28, wherein said determination means determines said type of said film as said type of monochrome film when value of said color separation data in Blue of said brightness data on said second region at re-reading is less than a sixth threshold value, and said values of said color separation data of said brightness data on said second region are within said plurality of predetermined ranges; and said determination means determines said type of said film as said type of six-frames color negative film when value of said color separation data in Blue of said brightness data on said second region at re-reading is less than a sixth threshold value, and said values of said color separation data of said brightness data on said second region are outside said plurality of predetermined ranges.

* * * * *